Dec. 9, 1924.  1,518,641

L. N. DYHRBERG

BRICKMAKING MACHINERY

Filed July 15, 1921   15 Sheets-Sheet 1

Inventor
L. N. Dyhrberg
By Marks & Clerk
Attys

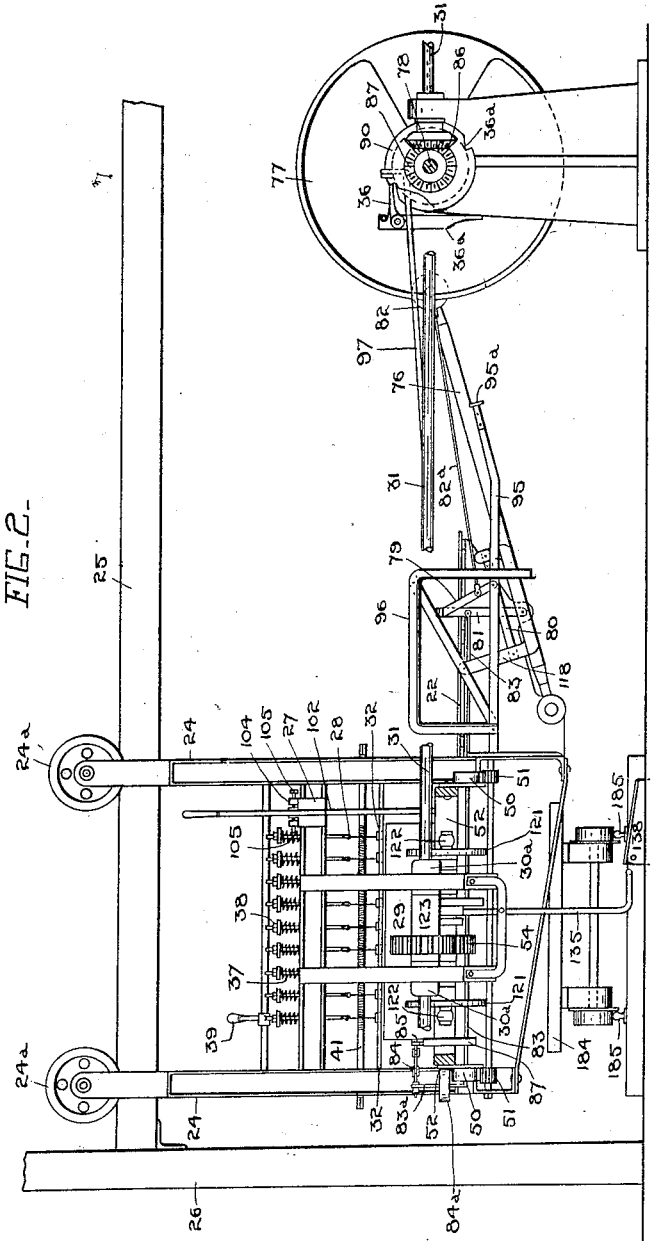

Dec. 9, 1924.                    L. N. DYHRBERG                    1,518,641
                                BRICKMAKING MACHINERY
                    Filed July 15, 1921           15 Sheets-Sheet 3
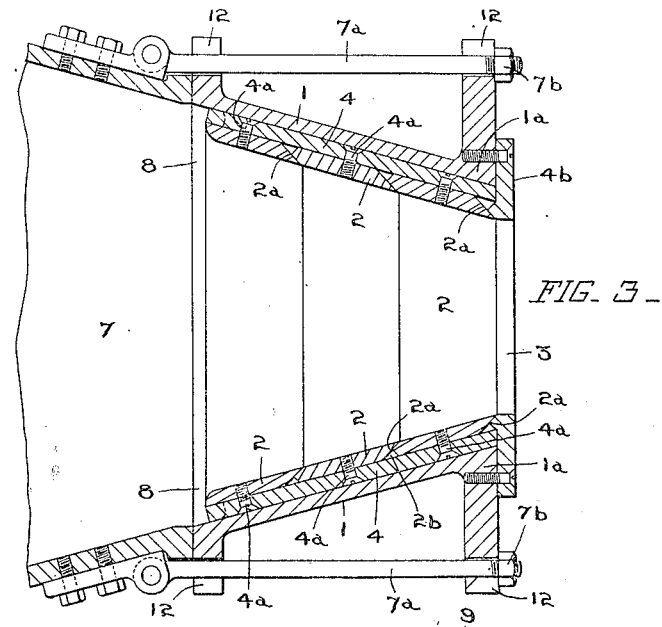
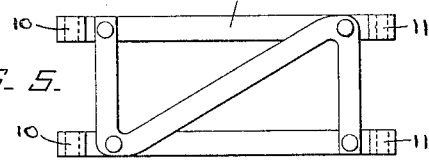
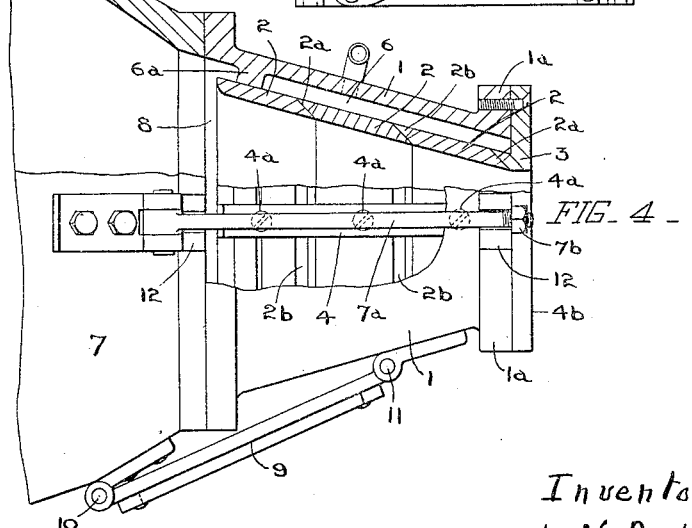
Inventor
L. N. Dyhrberg
By Marks & Clerk
   Attys Dec. 9, 1924. 1,518,641
L. N. DYHRBERG
BRICKMAKING MACHINERY
Filed July 15, 1921 15 Sheets-Sheet 4
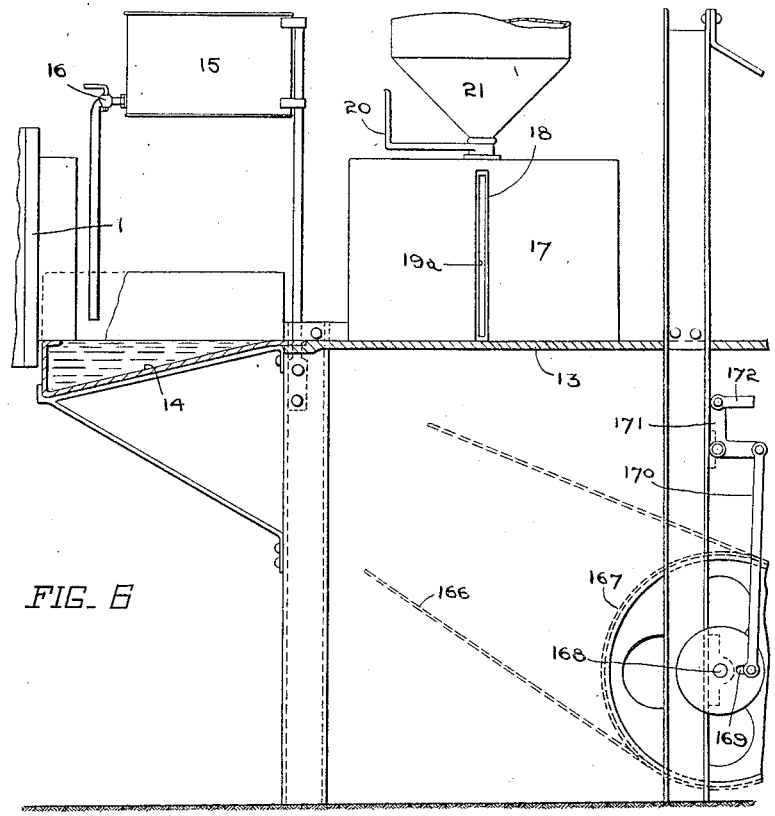
FIG. 6
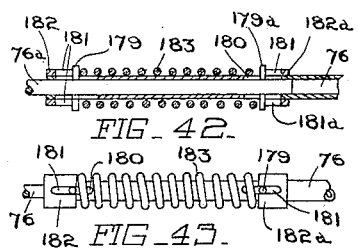
FIG. 42.
FIG. 43.
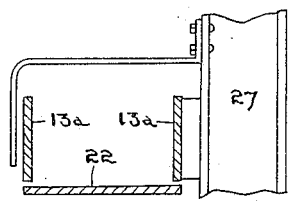
FIG. 48.
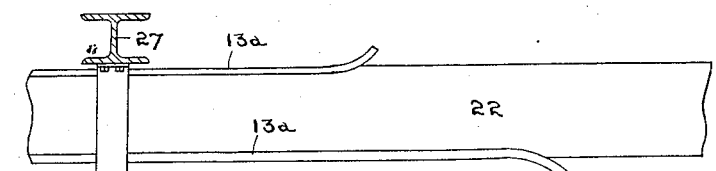
FIG. 47.
Inventor
L. N. Dyhrberg
By Marks & Clerk
Attys Dec. 9, 1924.                                        1,518,641
L. N. DYHRBERG
BRICKMAKING MACHINERY
Filed July 15, 1921          15 Sheets-Sheet 5
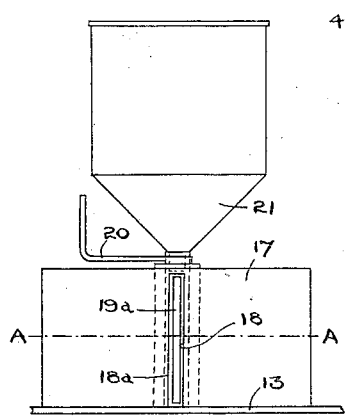
FIG_7_
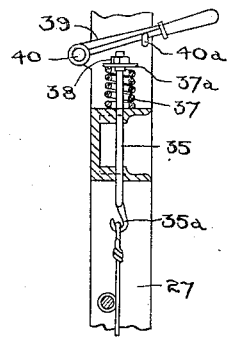
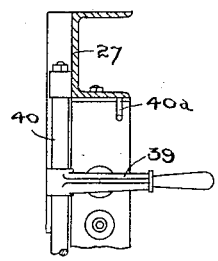
FIG_14_
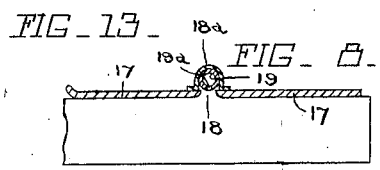
FIG_13_   FIG_8_
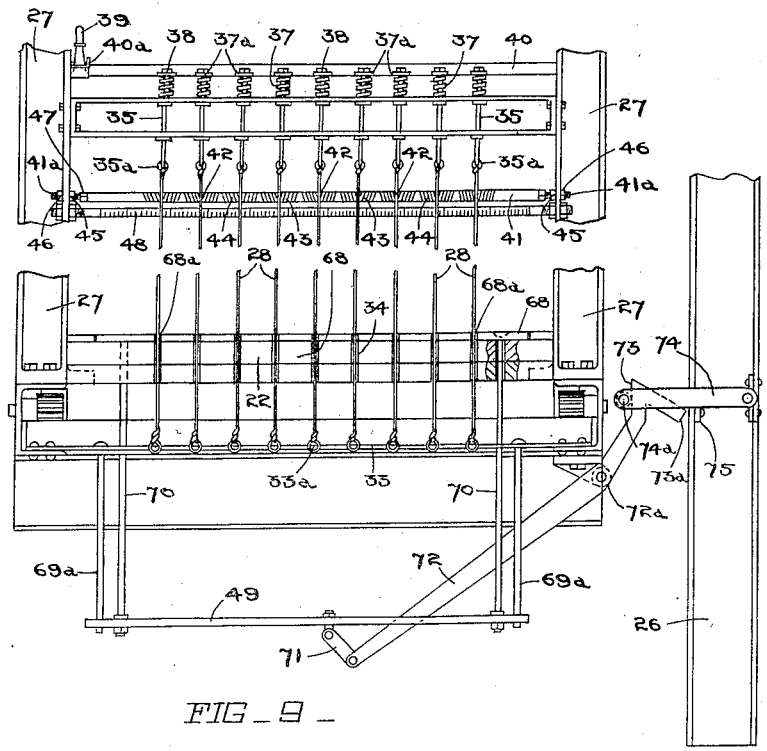
FIG_9_
Inventor
L. N. Dyhrberg
By Marks & Clerk
Attys Dec. 9, 1924.  1,518,641
L. N. DYHRBERG
BRICKMAKING MACHINERY
Filed July 15, 1921   15 Sheets-Sheet 6
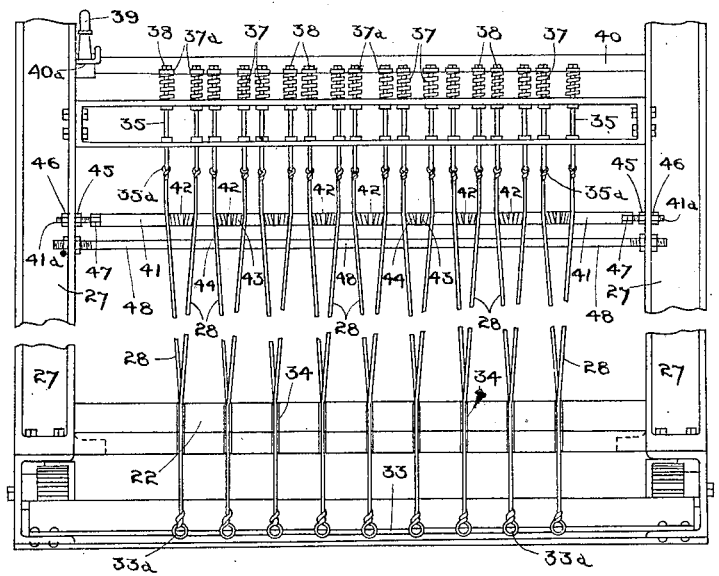
FIG_10_
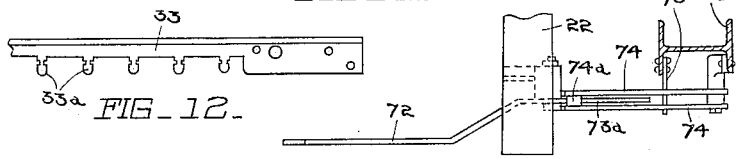
FIG_12_   FIG_11_
FIG_44_
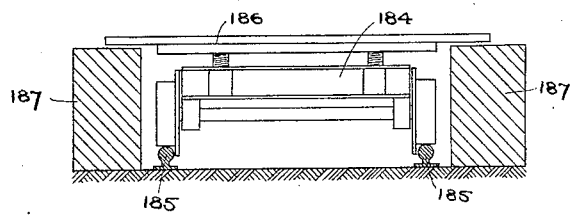
FIG_45_
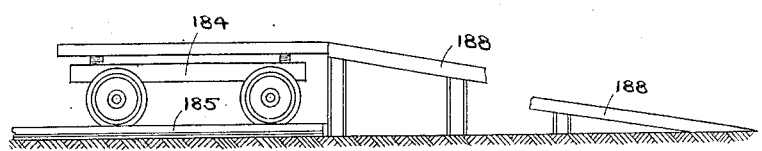
Inventor
L. N. Dyhrberg
By Marks & Clerk
Attys Dec. 9, 1924.                                    1,518,641
L. N. DYHRBERG
BRICKMAKING MACHINERY
Filed July 15, 1921         15 Sheets-Sheet 7

Inventor
L. N. Dyhrberg
By Marks & Clerk
Attys

Dec. 9, 1924.
L. N. DYHRBERG
1,518,641
BRICKMAKING MACHINERY
Filed July 15, 1921    15 Sheets-Sheet 8
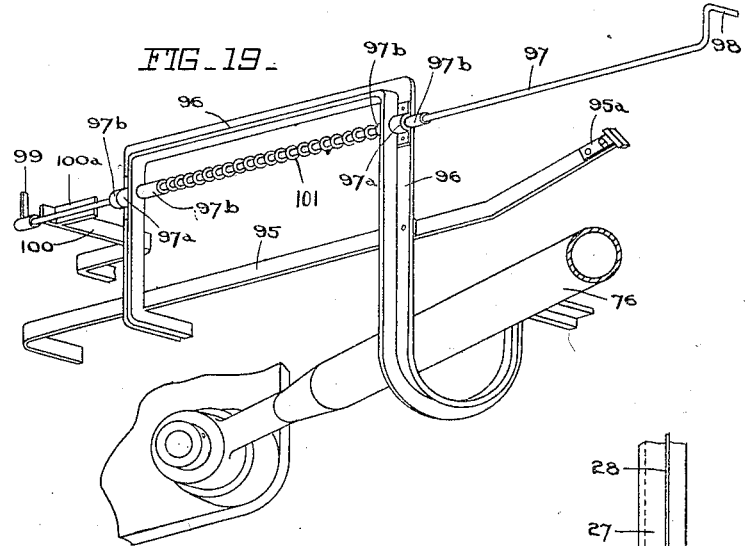
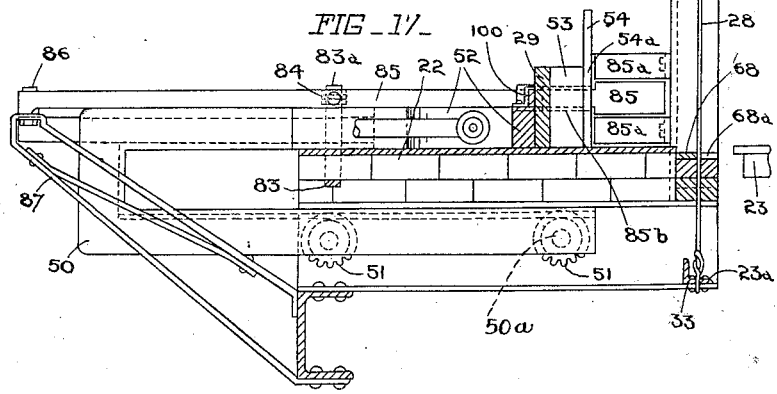
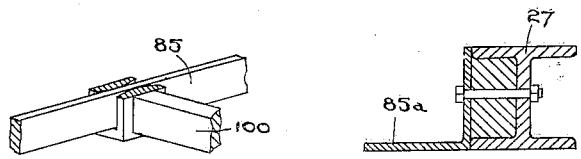
Inventor
L. N. Dyhrberg
By Marks & Clerk
attys.

Dec. 9, 1924.                                              1,518,641
L. N. DYHRBERG
BRICKMAKING MACHINERY
Filed July 15, 1921      15 Sheets-Sheet 9

Inventor
L. N. Dyhrberg
By Marks & Clerk
Attys

Dec. 9, 1924. 1,518,641
L. N. DYHRBERG
BRICKMAKING MACHINERY
Filed July 15, 1921  15 Sheets-Sheet 10
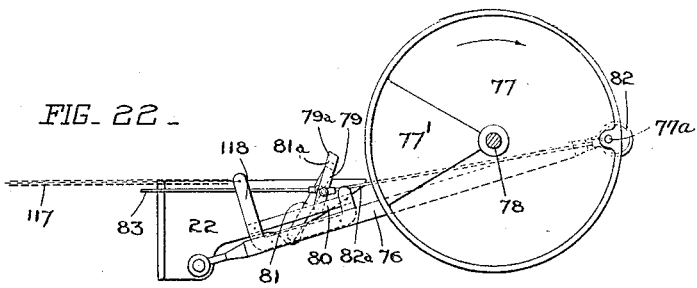
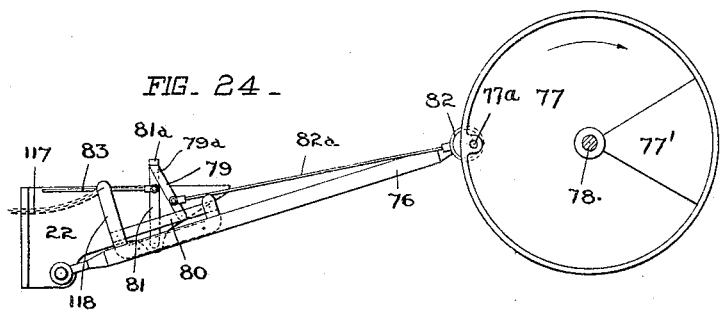
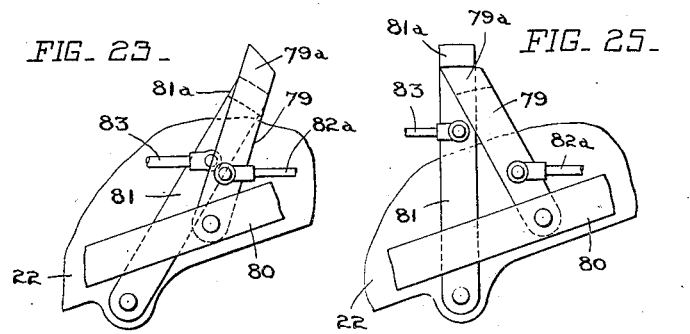
Inventor
L. N. Dyhrberg
By Marks & Clerk
attys Dec. 9, 1924.
L. N. DYHRBERG
BRICKMAKING MACHINERY
Filed July 15, 1921    15 Sheets-Sheet 11
1,518,641
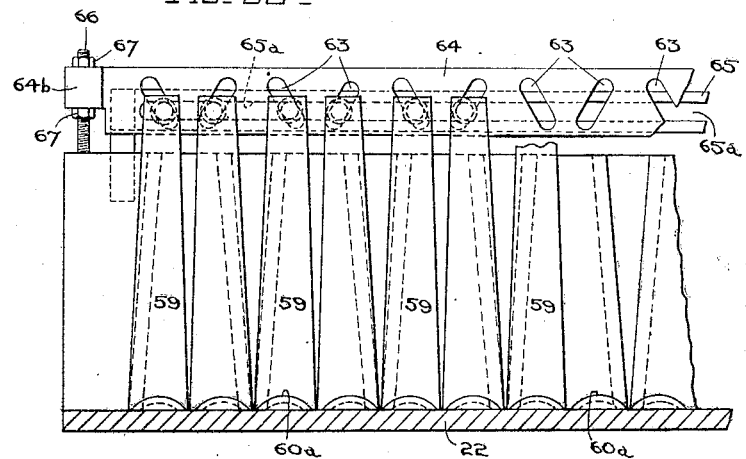
FIG. 26.
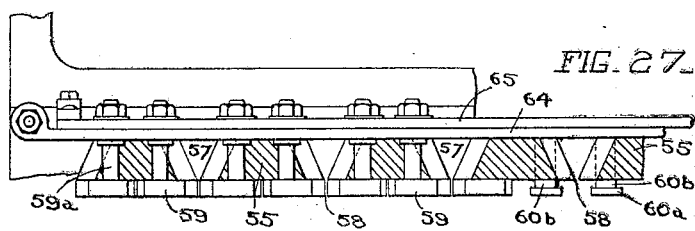
FIG. 27.
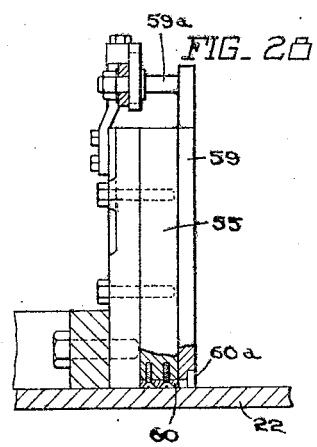
FIG. 28.
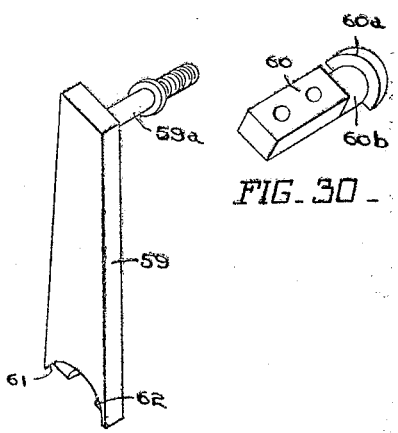
FIG. 29.
FIG. 30.
Inventor
L. N. Dyhrberg
By Marks & Clerk
Attys Dec. 9, 1924.  1,518,641

L. N. DYHRBERG

BRICKMAKING MACHINERY

Filed July 15, 1921  15 Sheets-Sheet 12

Inventor
L. N. Dyhrberg
By Marks & Clerk
Attys

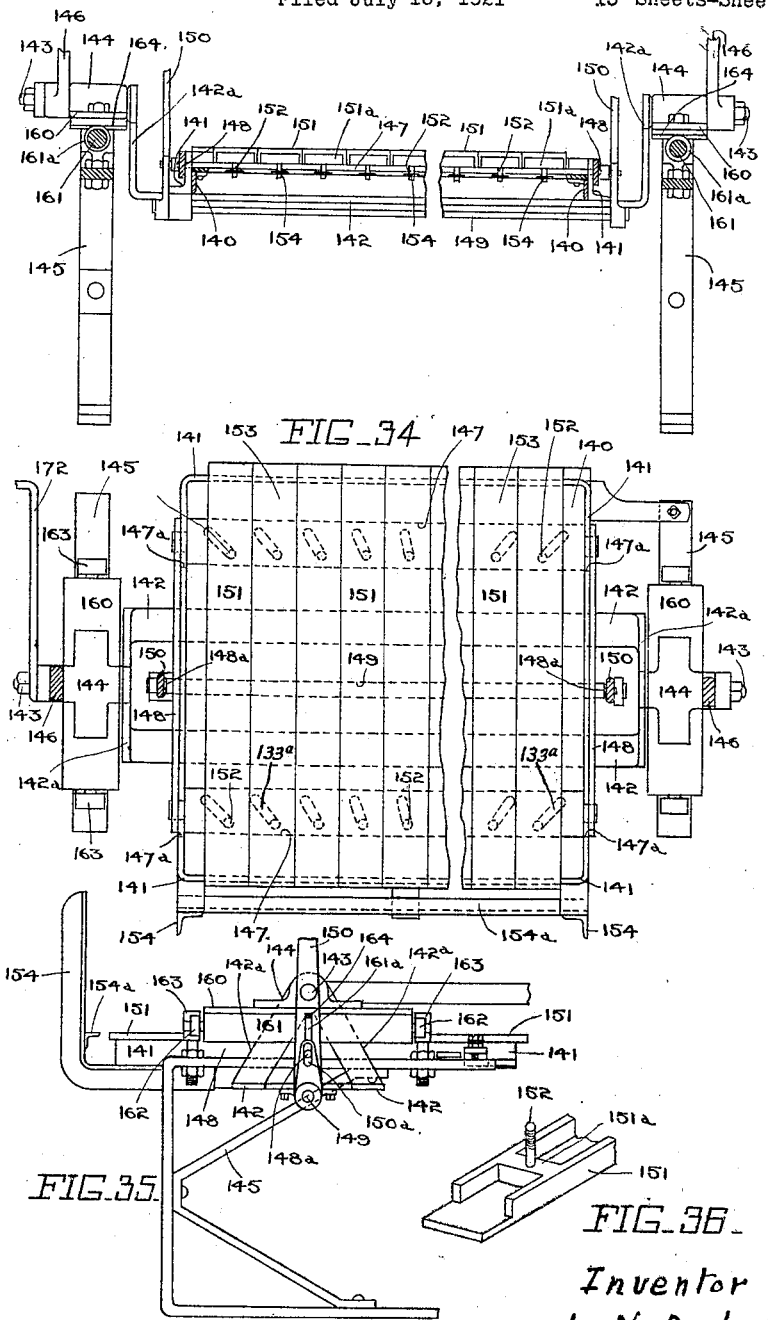

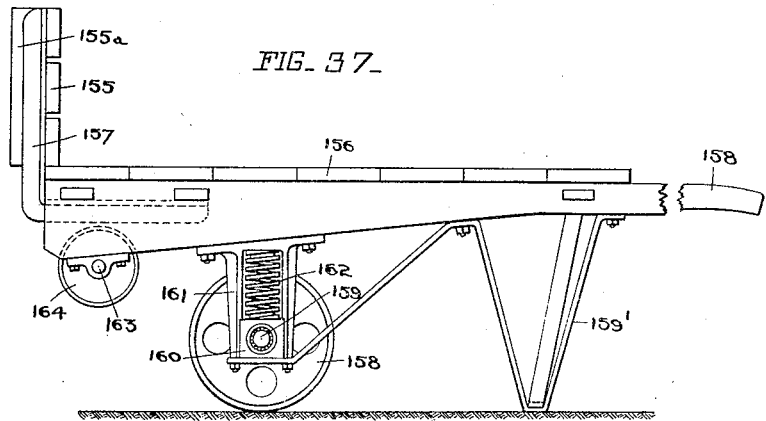
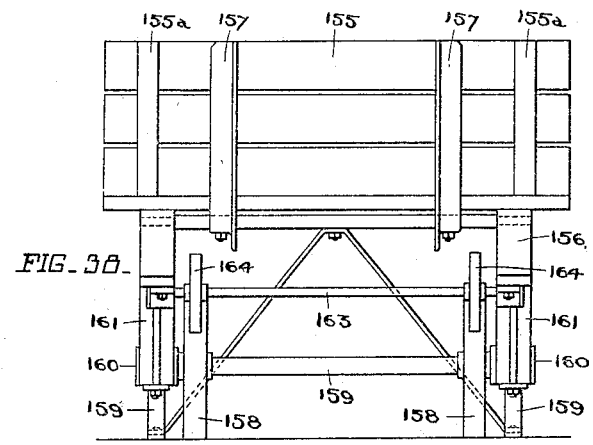
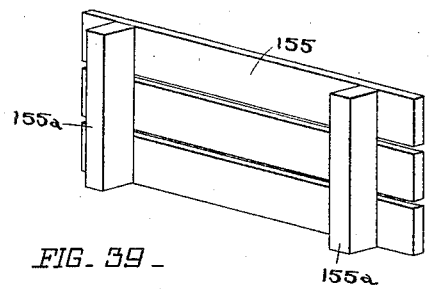

Dec. 9, 1924.
L. N. DYHRBERG
1,518,641
BRICKMAKING MACHINERY
Filed July 15, 1921    15 Sheets-Sheet 15
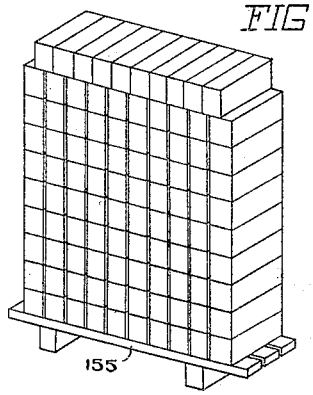
FIG_40_
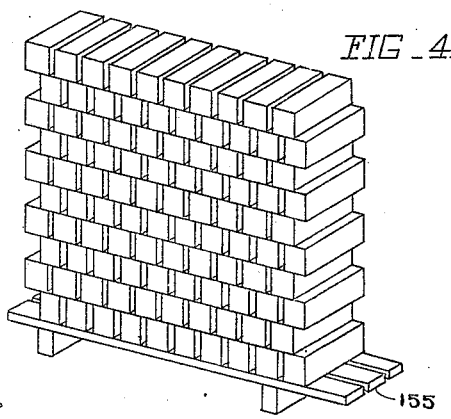
FIG_41_
Inventor
L. N. Dyhrberg
By Marks & Clark
Attys Patented Dec. 9, 1924.

1,518,641

UNITED STATES PATENT OFFICE.

LAURITZ NEILSEN DYHRBERG, OF ASHBURTON, NEW ZEALAND.

BRICKMAKING MACHINERY.

Application filed July 15, 1921. Serial No. 485,008.

*To all whom it may concern:*

Be it known that I, LAURITZ NEILSEN DYHRBERG, a citizen of the Dominion of New Zealand, and a subject of the King of Great Britain and Ireland, residing at 17 Winters Road, Allenton, Ashburton, in the Provincial District of Canterbury, declare that I have invented certain new and useful Improvements in Brickmaking Machinery, of which the following is a specification.

This invention relates to brickmaking machinery, and while its general object is the provision of improved means whereby bricks can be produced more quickly and in a better manner than heretofore, its special object is to provide for the stacking and dealing with cut bricks in bulk so as to eliminate individual handling and cut down the employment of hand labour to a minimum whereby not only is the cost of production reduced considerably, but the output is enabled to be dealt with in such a manner that production can be carried on continuously and expeditiously.

Machinery in general use for making bricks comprises three principal parts, namely a pug mill, a lubricated rectangular die or mould, and a cutting table.

In the manufacture of clay bricks by the wire cut process the improvements are carried out as follows.

The rectangular die can be secured to the pug mill mouth with its greatest cross sectional dimension either horizontally disposed, as is usually the case, or vertically for the purpose of causing the clay column to issue on edge, so that when the bricks are cut, they will be formed on end. This latter position provides special facilities for the mechanical stacking and handling of bricks and is an important factor in the elimination of hand labour, as will be hereinafter more particularly pointed out.

The clay column, on issuing from the die has its lower surface lubricated, and one vertical side sanded, as it slides along a fixed or stationary stand, on to a travelling cutting table which is of such a length that when in the loading position, it is partly telescoped beneath, or covered by the stationary stand.

When the end of the clay column reaches the farthest end of the cutting table, it operates mechanism, which releases a lock, whereupon the cutting table commences to move away from the pug mill under the pressure of and at the same speed as the issuing clay column.

When the cutting table is travelling under the pressure of the issuing clay column, a cutter carried on said table operates and severs from the column a length of clay exactly equal to a predetermined number of bricks.

Shortly after the length of clay has been severed from the issuing clay column, a clutch is put into gear whereupon the cutting table is speeded up and caused to convey the severed length of clay at a greater speed than that at which the clay column advances, to a delivery position when on coming to a standstill, a plunger on the cutting table is brought into use and forces the severed length of clay through the wires of the cutting table.

Each row of bricks as the latter come from between the cutting wires is delivered directly on to a tilting delivery table. The table is made large enough to accommodate a predetermined number of rows of bricks, in order that the latter can be transported in bulk and not in individual rows.

If the clay column is on edge then each severed length of clay is cut into a row of bricks on end, and the latter are pushed while on end, onto the tilting delivery table.

The plunger is then returned and during the latter movement re-sets the cutter used for severing lengths of clay from the oncoming column.

The return of the cutting table to its loading position at the stationary stand end of its run, follows, and another length of clay is severed from the clay column, brought to the delivery position and cut into a row of bricks by being forced through the cutting wires.

As each row of bricks is pushed by the plunger on to the delivery table the preceding row or rows are moved further on to said table. This continues until the table is filled with rows of bricks.

The delivery table is pivotally mounted so that its outer edge can be swung downwards if desired and the load of bricks transferred on to a barrow or other conveyor for transport.

Means are provided on the delivery table whereby an off bearing board can be placed in position to take the full table load of bricks when the table is tilted.

When the tilting delivery table is used to receive bricks on end, mechanism is provided whereby the table can be given side movement after each row of bricks is placed thereon. This is for the purpose of causing the joints between the bricks of a row to be crossed by the bricks of the rows at each side, for the purpose of giving stability to the stack or load.

Also when dealing with bricks on end means are provided on the delivery table receiving the rows of bricks from the cutting table, for spreading the bricks, in order to allow for the passage of air between them. These means comprise spreader plates fitted on the surface of the table, or barrow, at right angles to the line of travel of the clay column and cutting table.

As each length of clay is forced through the cutting wires and formed into bricks on end, the latter pass on to said plates. If the delivery table is not given side movement after it receives each row of bricks each brick follows exactly in the wake of the corresponding brick of the preceding row, and straight rows of bricks on end are formed right across the delivery table at right angles to the line of travel of the clay column and cutting table. If the delivery table be given side movement after it receives each row of bricks from the cutting wires in order to cross the joints as before mentioned, then the rows of bricks at right angles to the travel of the cutting table are zigzagged.

The spreader plates are so fitted and connected that whether the rows of bricks at right angles to the travel of the clay column and cutting table be straight or zigzagged they, the plates, can be operated to cause said rows to be opened or moved apart a sufficient distance to permit of the passage of air between the bricks.

When the rows of bricks at right angles to the cutting table are left straight, the delivery table is given side movement only before the last row of bricks passes from the cutting wires on to the table. This causes the bricks of the last row to cross the joints between the bricks of the preceding row and act as a tie when the bricks are brought on to the flat on the table being tilted to transfer its load on to a barrow or a truck, and when the load is being deposited in a vertical position on the ground by upending a barrow.

Provision is also made for cleaning the cutting wires after each and every cutting of bricks; for adjusting the cutting wires to cut arch bricks, in which case a specially constructed plunger is required; for locking the travelling cutting table at each end of its run; for holding each severed length of clay firmly on the cutting table during the latter's travel, and when stopping and starting same; and also for mounting and lubricating the die.

The invention will now be described in detail with reference to the accompanying drawings wherein:—

Figure 2 is an elevation thereof.

Figure 3 is a detail view in sectional elevation of the die while

Figure 4 is a part sectional plan and part plan view of same and

Figure 5 is an elevation of the double hinge used for mounting the die in the pug mill.

Figure 6 is a detail in elevation showing the arrangement of clay column lubricating means, the sanding means, stationary platform and part of the gear for transmitting side motion to the delivery table.

Figure 7 is an elevation of the sanding mechanism and

Figure 8 is a sectional view thereof taken on the line A—A Figure 7.

Figure 9 is an elevation illustrating the stringing of the cutting wires for rectangular brick cutting and also the wire cleaning apparatus.

Figure 10 is an elevation illustrating the arrangement cutting wires for arch brick cutting.

Figure 11 is a plan view of the wire cleaner operating mechanism.

Figure 12 is a part plan view of the bar to which the lower ends of the cutting wires are attached.

Figures 13 and 14 are a sectional elevation and part plan view respectively of means for taking the strain of the cutting wires when adjusting same.

Figure 16A:
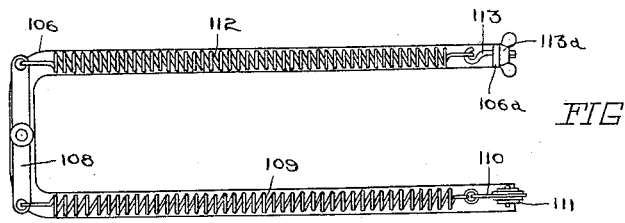
Figure 16:
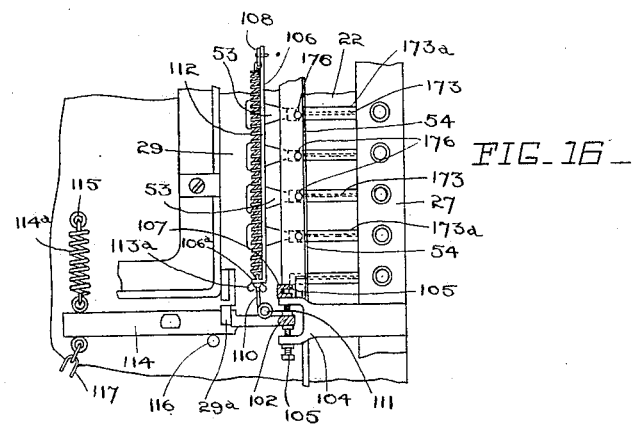

Figure 16 a plan view showing the mounting and operation on the cutting table of the bar cutter and knives.

Figure 16$^a$ is a detail view of the bar cutter operating means.

Figure 17 is a vertical cross sectional view of the cutting table.

Figure 18 is a detail view of a connection thereon.

Figure 19 is a perspective view of the push rod connected to the cutting table and the mounting of a trip rod for controlling the clutch actuating said rod.

Figures 20, 21:
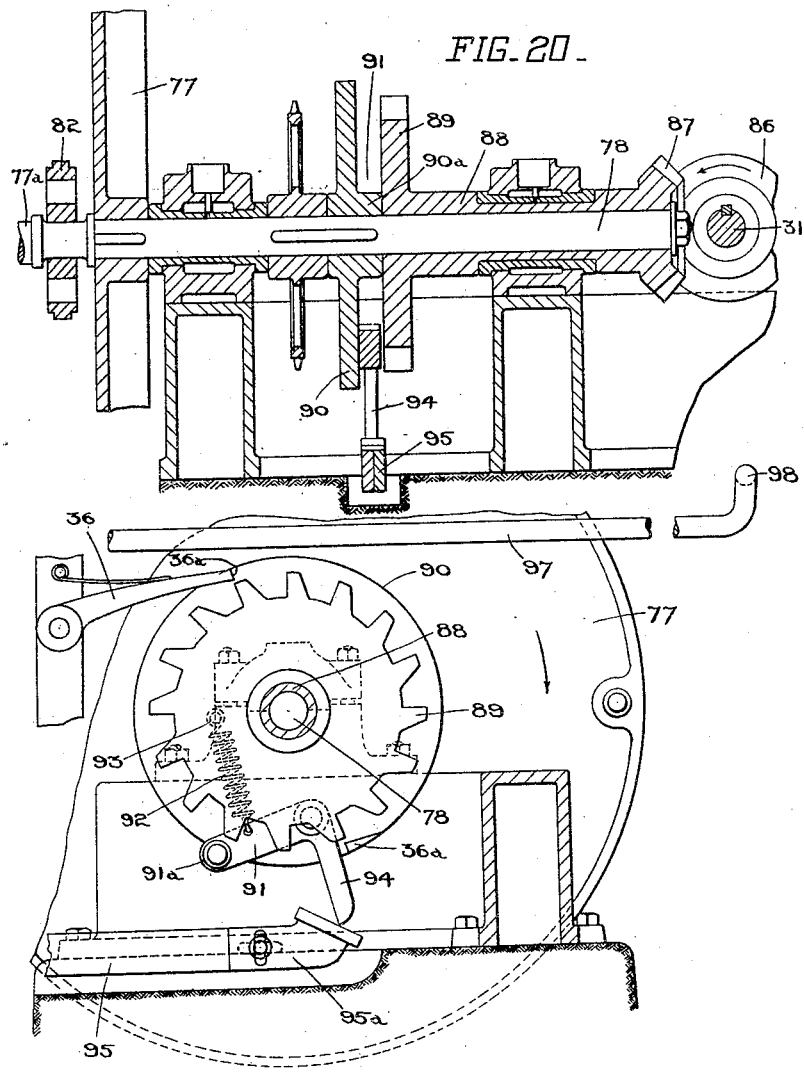

Figure 20 is a sectional elevation of the clutch and gear for actuating the cutting table push rod and Figure 21 is a side view of said clutch.

Figure 22 is an elevation showing the positions of the cutting table, push rod with locking device thereon and crank connected to said rod when the table is at the stationary platform end of its run.

Figure 23 is a detail view of the locking device when the cutting table is in the position indicated and the crank rod and push rod are as shown in the preceding figure.

Figure 24 shows the positions of the crank and push rod with locking device thereon when the cutting table is at the delivery table end of its run.

Figure 25 is a detail view of the locking device as it appears when the parts enumerated in Figure 24 are in the positions indicated.

Figure 26 is a part front elevation and

Figure 27 a part plan view of an alternative construction of plunger operating on the cutting table and adapted for either arch or rectangular brick cutting.

Figure 28 is an end view of the plunger as shown in Figures 26, 27.

Figures 29, 30 show details of parts used in Figures 26, 27, 28.

Figure 31:
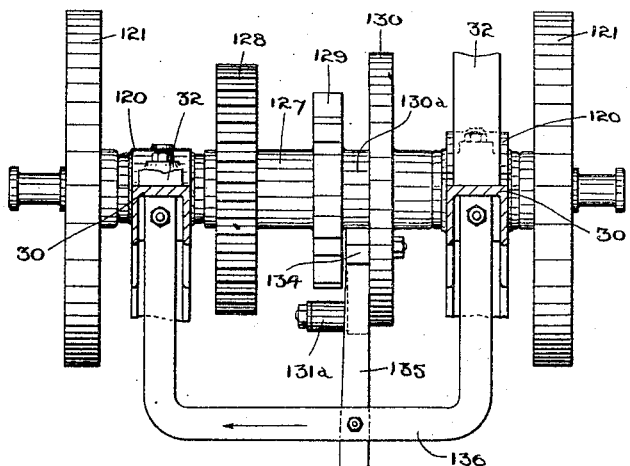
Figure 32:
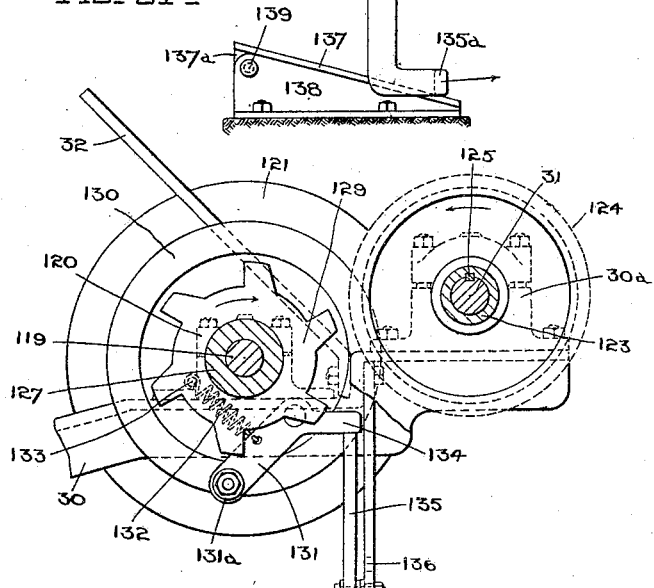

Figures 31 and 32 are a side view and an end view respectively of the clutch and gear for actuating the plunger on the cutting table.

Figures 33, 34 and 35 are a vertical cross section, a plan and a side view respectively of the delivery and stacking table.

Figure 36 is a perspective view of the inverted end of one of the spreader plates, used on the delivery table.

Figures 37 and 38 are a side elevation and front view respectively of the off bearing barrow.

Figure 39 illustrates in perspective an off bearing board.

Figures 40, 41 illustrate alternative methods of stacking bricks, as performed by the machine.

Figures 42 and 43 are a sectional elevation and a plan view respectively of shock absorbing means, for use on the rod operating the cutting table.

Figure 44 is a cross sectional view of a truck and railed track showing special facilities for setting down and picking up a load.

Figure 45 is an elevation showing a truck at a special unloading and loading platform.

Figure 46 is a sectional plan showing the stop bars on the cutting table and

Figures 47 and 48 are a plan view and cross sectional view respectively of the extension of the cutting table showing walls thereon.

The die (Figures 3 and 4) comprises a tapered casing or cover 1, a tapered series of inner separate rectangular frames 2, and a mouthpiece 3 making contact with the outer of the frames 2, and secured to the casing or cover 1.

The frames 2 are formed with bevelled overlapping edges 2$^a$, and are held together by upper and lower bars 4 through which screws 4$^a$ enter said frames.

The overlapping edges of the frames 2 do not fully cover the overlapped edges, but are cut off abruptly as shown, in order to provide grooves 2$^b$ around the outside of the tapered series of frames 2 to lead lubricating fluid to between the latter.

The frames 2 are joined together, in order that they may be inserted or withdrawn from the casing or cover 1 together and also so that they will be kept in direct line with each other and the mouthpiece 3.

The mouthpiece 3 is bevelled on its inner side, to fit against the bevelled edge of the outer of the frames 2, and also has a flange 4$^b$, through which it is secured to the flange 1$^a$ at the smaller or outer end of the casing or cover 1.

The casing or cover 1 is greater in width and height than the series of frames 2, so as to provide a space 6 for the reception of lubricating fluid all around said frames 2 except where the bars 4 are fitted. Also at its inner or larger end the casing or cover 1 projects beyond the plates 2, and makes contact with the mouth of the pug mill 7, leaving a space 8 between the latter and the inner or large end of the series of frames 2.

An internal flange or rib 6$^a$ on the casing or cover 1 near the large end of the latter keeps the inner end of the series of frames 2, centrally within the casing or cover 1.

The die is fitted to the mouth of the pug mill 7, with its greatest cross sectional dimension either vertical or horizontal according to whether it is desired that the clay column shall issue on edge or on the flat.

The mounting of the die in position is effected by the carrier frame 9 (Figure 5) which is hinged at 10 to the pug mill 7 and at 11 to the casing or cover 1 near the outer or small end thereof.

By these means the die can be swung horizontally to or from the mouth of the pug mill 7 in a line parallel with the mouth of the latter, so as to economize space and also allow the die to seat the four edges at its larger end simultaneously and squarely against the face plate of the mill 7 thereby facilitating the putting on or the removal of the die besides ensuring perfect alignment with the mill mouth.

The means for clamping the die to the pug mill 7 comprise upper and lower bolts 7$^a$ hinged to the latter and adapted to pass into slotted lugs 12 on the large and small ends of the casing or cover 1. Nuts 7$^b$ screwed on the threaded ends of the bolts 7$^a$ ensure the die being securely held on the pug mill 7.

The object in providing the space 8 between the inner or large end of the series of frames 2 and the pug mill 7 is to provide for the prevention of the back escape of lubricating fluid from the space 6, as the clay in passing through the die flows into the space 8 and effectively seals the rear joint between the casing or cover 1 and the rear frame 2. The front joint between the flanges 1$^a$ and 4$^b$ being made tight the only escape for the lubricating fluid is through the joints between the frames 2 has the effect of lubricating the interior of the die.

Figure 1:
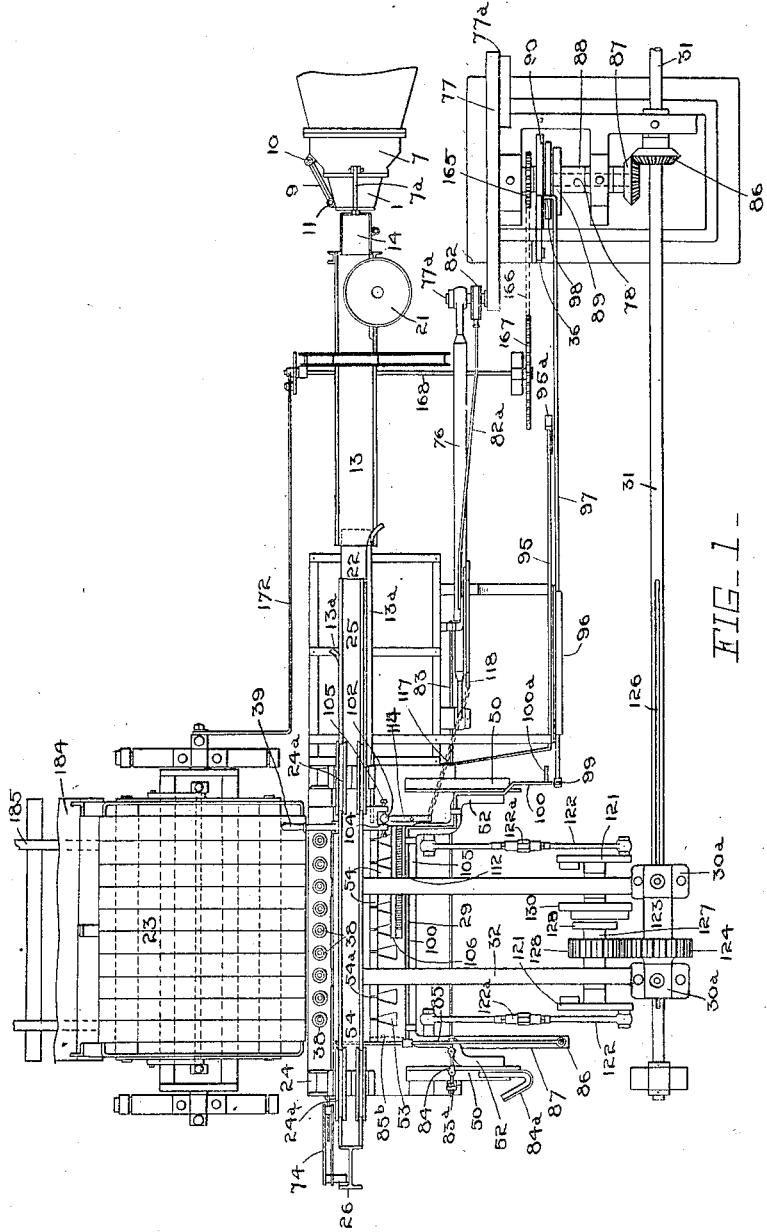
Figure 1 is a plan view showing the general arrangement of the machine.

In Figures 1, 3 and 4 of the drawing the die is shown fitted to the pug mill with its greatest cross sectional dimension vertical, for the purpose of causing the column of clay to issue on edge.

The result of the clay column being on edge is that three valuable improvements in the production of wire cut bricks are enabled to be carried out. The first of these improvements is the ability to stack bricks in bulk without individual handling as the bricks when cut can be delivered on end in any desired number of rows on to a tilting table, which when tilted or tipped from the horizontal to the vertical converts its load into a stack of bricks on the flat, which stack can be deposited on a barrow or a truck for transport where required, or said bricks can be delivered on end in any desired number rows either direct on to a barrow, or over a stand, or the aforesaid delivery table, on to the barrow, which in being tilted or tipped to deposit its load converts the latter into a stack of bricks on the flat.

The second improvement lies in the facility with which arch bricks can be cut upon the same machine, the clay column on edge lending itself readily to this improvement.

The third improvement is the cutting of bricks with firmer and sharper edges than is usually obtained when using stationary cutting wires, as by cutting bricks on end or vertically, not only is the actual cutting performed more quickly than hitherto, but the long edges of the bricks on one side when the cut is being made, are forced inwards, while the long edges at the other side are protected or kept from tearing by the pressure of the plunger. The edges of the cuts at the heads of the bricks, or at the upper edge of the clay column are also protected, by being formed prior to the actual cutting by the downward entrance or biting into the clay column of knives prior to the severed length of clay being brought opposite the punger, said knives remaining in the cuts while the clay is forced through the cutting wires.

When the die is used with its greatest cross sectional dimensions vertically disposed as shown in the drawings, it is also possible to provide the casing or cover 1, with two series of lubricated interior frames 2, side by side, and a double mouth piece, so that two columns of clay will issue simultaneously and side by side.

The upright die position lends itself readily to the improvement, as the two clay columns, would be very little wider, and very little more space is required than is necessary with a single column of clay issuing on the flat. Two columns on edge and close together measure nearly the same across, as one column on the flat.

Otherwise the machine operates practically the same, as when a single clay column only is issuing except that two rows of bricks would be cut and delivered at each operation of the plunger on to the cutting table resulting in a considerable increase in the output of the machine.

Situated just outside the die mouth is a stationary stand 13 the upper surface of which is on a level with or slightly below the bottom edge of the die mouth (Figures 1 and 6).

The stand 13 extends in the direction of travel of the clay column as the latter issues from the die and is necessary for the practical working of the mechanically controlled travelling cutting table 22 as if it were not for this stand erected in combination with the cutting table a gap would be left between the die and said table, when the latter moves to the delivery position, thereby rendering the working of the machine as outlined herein impracticable.

In order to facilitate the passage of the clay column along the stand 13 and on to and along the cutting table 22 to be hereinafter described, provision is made for lubricating the clay column. This is done by bridging the gap between the die and the stand 13 with a holder or tray 14 with upturned side edges, said holder or tray 14 receiving oil or other lubricating fluid from an over head container 15 from which the fluid is permitted to drip through a spout and tap 16, at such a rate that there is always sufficient fluid in the holder of tray 14, to ensure the bottom edge of the clay column being given a thin film of oil or the like, as it passes from the die on to the stand 13.

Also as later on in the process of forming the bricks a plunger carried and operating on the cutting table 22 comes in contact with one of the vertical sides of the clay column, it is necessary that said side should be made so that there will be no possibility of the clay adhering to the plunger and also so that the rows of bricks when stacked, will not stick together.

The tendency to stick is not serious if oil be used as the die lubricant, but if water or steam is used the tendency to stick, or disfigurement arising from this cause, can only be prevented by sanding or drying the surface or surfaces which come in contact with the plunger and with each other.

Owing to the fact that the side or surface of the column which it is necessary to sand or dry is vertically disposed it is obvious that spreading or throwing sand in the ordinary way will not suffice, and that special means for carrying out the sanding are therefore required.

The sanding mechanism (Figures 1, 6, 7 and 8) is constructed and operated as follows:—

A flat plate 17 is fitted vertically to the rear edge of the stand 13 near the die end thereof so as to be on the same side of the clay column as the plunger 29 and parallel with the line of travel of the advancing clay column, and in such a position that the rear vertical side of the latter will rub against it, as the column slides along the stand 13.

About midway in the plate 17 is a vertical slot, 18 extending from near the top to near the bottom of said plate.

At the rear of the plate 17 the slot 18 is covered by a casing 18ª U shaped in cross section. Housed in the casing 18ª is a tube 19 containing a vertical slot 19ª. The slotted tube 19 extends above the casing 18ª and is fitted with a handle 20 at its upper end, and is connected with the outlet of an overhead sand hopper 21.

By operating the handle 20 the tube 19 can be turned within the casing 18ª to cause the slot 19ª in the tube 19 to register with the slot 18 in the plate 17, or so that said tube 19 will close the slot 18.

The tube 19 fills with sand from the hopper 21, and by causing the slot 19ª to register with the slot 18 an even flow of sand through the latter slot occurs, causing the vertical side of the clay column presented to or in grazing contact with the plate 17 to be given an even coating or film of sand throughout an even height. Also by adjusting the slots 18, 19ª in relation to each other the escape or flow of sand can be regulated at will.

If two clay columns be issuing from the die, then provision must be made when necessary for sanding both columns, this however means merely duplicating the sand delivering means.

If oil is used as the die lubricant then the double sand feed is not necessary as the bricks of the first row will not stick to the bricks of the second row when dry, and sanding of the side of the column which comes in contact with the plunger is all that is required. When water is used both clay columns must be sanded or oiled as the raw moist surfaces would inevitably stick together.

The cutting table 22 (Figures 1, 2, 9, 10, 15, 16 and 17) is of the travelling type and runs in the line of travel of the column of clay issuing from the pug mill 7, from the stationary stand 13, to a position directly opposite the delivery table 23, to be hereinafter described, and vice versa (Figure 1).

The severing of a length of clay from the clay column, and the removal of the severed portion to a position in advance of or ahead of the oncoming clay column, is a necessary feature of this invention, as by doing this a clear space is obtained between the severed ends, whereby the severed length of clay can be cut into bricks and the latter delivered on to the tilting table, a barrow or a truck, and brought into position for stacking, without interfering in any way with the oncoming clay column.

The table 22 is slightly lower than the surface of the platform 13, and is of such a length, that when in position to receive a portion of the clay column, it is partly telescoped under or covered by the platform 13, this extra length being provided in order that when said table 22 is at the other end of its run or in its delivery position, there will be no gap left between the stationary platform 13 and the table 22.

The portion of the table 22 which telescopes or slides below the platform 13, has at each side a vertical wall 13ª the wall on the sanding mechanism side of the clay column path extending further towards the pug mill than the other wall while both walls are flared outwards at their ends nearest the pug mill (Figures 1, 47 and 48).

These walls are attached to the upper framework 27 of the cutting table 22 and are raised sufficiently to ride over the stationary platform 13, when the table 22 dives or telescopes below the latter.

The function of the walls 13ª is to form a lane or guide for the straight passage of the clay column on its way along the cutting table.

Mounted on the cutting table 22 is the vertical framework 27 located on the delivery table side of the line of travel of the clay column (Figures 1 and 2) and to said framework 27 are attached hangers 24 provided with wheels 24ª which run on an overhead track 25 supported by columns 26. If desired the cutting table can be mounted on wheels, which run on an underneath track, or both overhead and underneath tracks can be employed.

Figure 15:
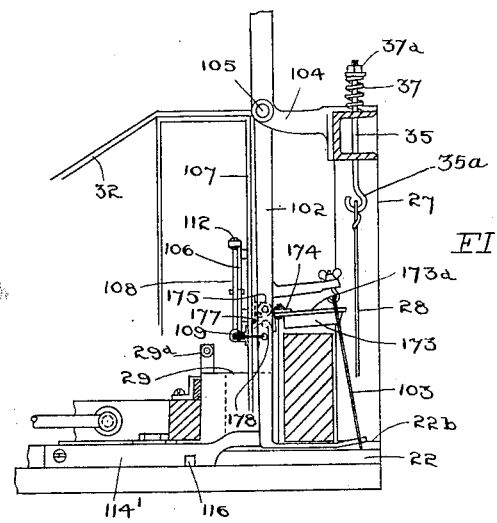
Figure 15 is an elevation.

The framework 27 has strung thereon a row of vertical cutting wires 28 arranged in a row parallel with the line of travel of the clay column and just clear of the front vertical face of the clay column (Figure 15). Also on the cutting table 22 but on the opposite side of the line of travel of the clay column and directly opposite the row of wires 28 is a plunger 29 (Figures 1, 2, 15, 16, 17) which operates horizontally on the table surface lever with and at right angles to the clay column and when stationary just clears the rear face of the clay column. This necessitates the extension of the table 22 more on one side of the line of travel of the clay column than on the other, to provide for the mounting and operation of the plunger 29 and further support is therefore required for said table 22.

To provide said support, and also for the transmission of power to the plunger, 29, arms 30 (Figures 1, 2, 31, 32) are extended at right angles from the under frame of the table 22 on the opposite side of the line of travel of the clay column to the delivery table 23, said arms 30 at their outer ends carrying bearings 30ª slidable on a horizontal power shaft 31 at the required height from the ground and parallel with the line of travel of the clay column. The arms 30 are braced by stays 32 from the top of the frame 27.

The cutting wires 28 (Figures 9 and 10) are looped at both upper and lower ends and are strung vertically in position as follows:

Secured to, but below the table 22 is a horizontal bar 33 provided with the requisite number of equally spaced projections 33ª. On to these projections 33ª are slipped the lower looped ends of wires 28 which are then passed upwards through vertical incisions 34 in the edge of the table 22 facing the delivery table 23.

The upper looped ends of the wires 28 are slipped on to hooks 35ª (also Figure 15) on the lower ends of vertical rods 35 which pass upwards through the upper horizontal member of the frame 27.

Spiral springs 37 are slipped on said rods 35, above the upper horizontal member, after which washers 37ª are placed on the rods 35, and finally the springs 37 are compressed by screwing nuts 38 on the upper ends of the rods.

The springs 37 hold the wires 28 taut yet allow same to give when an obstruction such as a stone in the clay is encountered, permitting the wires to pass around the stone rather than break during a cutting. The tension of the wires can be adjusted to the desired degree by tightening or unscrewing the nuts 38 as required.

In order to expedite the hooking on and unhooking of the wires 28 without having to unscrew or screw up the nuts 38 to any great extent, means are provided whereby each wire 28 can be relieved of the action of its spring 37, while unhooking or hooking a wire (Figures 13 and 14).

The means comprises a short hand lever 39 freely and slidably mounted on a rod 40 secured between the uprights of the frame 27, a short distance above, but parallel with the upper horizontal member through which the rods 35 pass.

The hand lever 39 extends over the upper ends of the rods 35, and by sliding said lever along the rod 40 to directly over the rod 35 of whichever wire 28 it is desired to replace or adjust, and pressing the outer end of the hand-lever 40 downwards, the spring 37 on the rod 35 in question can be compressed sufficiently and held so to relieve the wire 28 attached, of all tension, thus allowing it to be unhooked, or replaced as desired.

By mounting and operating the hand lever 39 as described and illustrated, wires 28 can be cut and looped at the required lengths and slipped on the projections 33ª and hooks 35ª quickly and without trouble, leaving if necessary only minor adjustments in tension to be made by the nuts 38.

When not in use the hand lever 39 is slid to one end of the rod 40 and rests in a bracket 40ª projecting from one of the uprights of the frame 27.

If desired a separate hand lever 39 can be provided for each wire 28.

A little above and parallel with the upper edge of the clay column and on the delivery table side of the cutting wires 28 is a longitudinal rod 41 mounted between the uprights of the frame 27 (Figures 9, 10).

This rod 41 is formed with the same number of circular grooves 42 therein as there are cutting wires 28 strung on the frame 27. When cutting rectangular bricks the wires 28 are vertical and equally spaced, parallel with each other each of said wires being accommodated in a groove 42. The function of the bar 41 is to resist and take the pressure of the wires 28 occasioned by the thrust of the plunger 29 in forcing a length of clay column through the wires 28, and the grooves 42 to provide seatings or guides for the latter whereby said wires are prevented from springing or spreading under the pressure of the plunger.

In order to provide for adjustment of the wires 28 to the required angles when cutting arch bricks, each groove 42 has cut on one side a fairly deep right hand screw thread 43, and on the other side a left hand screw thread 44.

The ends 41ª of the rod 41 are reduced and screwed both with the same thread, said ends being passed through plain holes in the uprights of the frame 27 or through portions of the latter, so as to enable an inner nut 45 and an outer nut 46 to be screwed on each end 41ª and the bar securely clamped at each end to the uprights.

The bar 41 can also be formed with one or more square or flat sided portions 47, either between the uprights of the frame 27 or extending beyond the latter in order to enable said bar 41 after the nuts 45 and 46 have been adjusted to be gripped and rotated by a spanner, or by a crank handle slipped on the squared or flat sided extension.

When cutting arch bricks each of the projections 33ª of the bar 33 has the lower looped ends of two wires 28 placed thereon, both of said wires passing upwards through the same incision 34, the upper looped end of each wire being however attached to a separate hook 35ª. The wires 28 therefore incline upwards away from each other.

When setting the wires 28 for arch brick cutting each pair of wires (a pair being two wires one at each side of a groove 42 and hooked at their lower ends on the same projection 33ª) is placed or seated in the screw threads 43, 44 so that each wire of a pair is the same distance from the groove 42 as its fellow on the other side of the groove 42 (Figure 10).

To secure perfect alignment of all the pairs of wires 28 simultaneously, the nuts 45, 46 are slackened off, whereupon on turning whichever of the latter is found necessary, the bar 41 while being held against turning movement can be moved endways in the uprights of the frame 27 taking with it all of the wires 28.

To adjust the wires 28 of the pairs, in relation to each other, the bar 41 after the nuts 45, 46 have been slackened to the necessary extent is turned by means of a spanner or handle, applied to or slipped on the square or flattened portions or extensions.

Owing to the fact that one wire 28 of each pair thereof is engaged in a right hand thread, and the other wire is engaged in a left hand thread, the wires of the pairs can be made to move towards or from each other by turning movement of the bar 41.

By these means the position of all the pairs of cutting wires can be altered simultaneously and to exactly the same extent, and alteration of the angles of inclination of the wires of the pairs to each other, can be made to vary microscopically from hair's breadth alterations to large ones, such alterations depending upon the gauge or arching required.

In order to provide a guide or indicator for setting the cutting wires 28, a flat bar 48 with reduced ends and adjustable endways in the uprights of the frame 27 in a manner similar to the bar 41, is provided above or below the latter.

The bar 48 touches the cutting wires 28 and has markings thereon indicating the various gauges of arching so that the person adjusting the wires 28 will know exactly where to set the wires, in order to cut a particular gauge of arch bricks.

The plunger 29 (Figures 1, 2, 15, 16, 17) for pushing a severed length of clay column through the cutting wires 28 for the purpose of forming bricks is mounted on toothed carrier arms 50 (Figures 1, 2, 17) which run on toothed wheels 51 mounted on spindles 50ª below the level of the cutting table floor.

The directly opposite toothed wheels 51 are keyed on the same spindle 50ª thereby ensuring at all times that the arms 50 remain exactly parallel with each other, and work at right angles to the clay column. This mounting of the carrier arms is necessary on account of the liability of the plunger 29 to twist under the resistance occasioned by the resetting of the bar cutter.

For cutting ordinary rectangular bricks the plunger 29 is attached to a back plate 52 bent as shown in Figure 1 and attached to the carrier arms 50 and is formed with a number of space voids 53 therein one opposite each of the vertical cutting wires 28. These space voids 53 increase in width towards the back plate 52. The solid portions between the space voids 53 are faced with vertical plates 54 placed close together so as to provide vertical slits 54ª one opposite each wire 28 and leading into a space void 53.

When the plunger 29 moves forward and forces a severed length of clay column through the wires 28, the vertical slits 54ª and the space voids 53 pass upon the wires.

These space voids 53 serve the purpose of preventing the slits 54ª from choking up with weeds and other débris, and the vertical edges of the plates 54 being close together prevent the back edges of the bricks from tearing away as the latter leave the wires 28.

If arch brick cutting is desired, another form of plunger is required, as the above described plunger is only suitable for cutting ordinary rectangular bricks.

This special plunger (Figures 26 to 30) operates on the cutting table 22 level with and at right angles to the clay column, in the same manner as the former plunger and has formed on its side facing the delivery table 22 a series of blocks 55 which taper upwards and have their inclined side edges bevelled so that the spaces 57 between the blocks 55 as well as being wider at the top than at the bottom, have a greater width at the rear than at the front.

These blocks 55 at the bottom of their front surfaces are of such a width that they very nearly touch each other so as to leave only slits 58 between them, the latter being located one opposite each of the cutting wires 28.

Working against the outer faces of the blocks 55 are upwardly tapered vertical plates 59 each mounted at its lower end on the rounded head 60ª of a support 60 projecting from the bottom of a block 55. These supports 60 have also a reduced portion 60ᵇ, the bottom of each plate 59 being formed with an opening having a large radius 61, and a smaller radius 62, the former sitting on the head 60ª and the latter on the reduced portion 60ᵇ of the support 60. By these means the plates 59 while free to rock sideways on the supports 60 are prevented from working off same.

At their upper ends the plates 59 are provided with pins 59ª which extend rearwardly over the plunger and enter inclined slots 63 in a horizontal bar 64, adjustable vertically, and also the horizontal slot 65ª of horizontal bar 65 rigidly mounted on the plunger. The bar 64 has at its ends eyes 64^b which pass upon vertical screws 66 projecting upwards from the plunger. Nuts 67 on said screws 66 above and below the eyes 64^b of the bar 64 provide the means for raising and lowering the latter.

The plates 59 are mounted on the faces of the blocks 55 in pairs, that is to say, one at each side of a space 57, the pins 59^a of each pair of plates 59 entering a pair of slots 63 which converge upwards.

It will thus be seen that if the bar 64 be moved downwards on the vertical screws 66 the plates 59 of each pair thereof will move or swing on their supports 60 towards each other at the upper ends, and if the bar 64 be raised then the plates of the pairs will open out or move from each other at their upper ends.

These plates 59 of the pairs are opened out or closed as required to permit the plunger to pass on to the pairs of cutting wires strung and set as previously described for arch brick cutting and illustrated in Figure 10 the spaces between the plates 59 of the pairs thereof, and the spaces 57 between the blocks 55 passing upon the pairs of cutting wires 28, as do the slits and space voids in ordinary rectangular brick cutting.

This last described construction of plunger can also be adapted for ordinary rectangular brick cutting. If this is required the plates 59 of the pairs thereof are simply brought close together to provide vertical slits opening into the spaces 57 behind.

At every cutting of bricks it is found that a considerable amount of fibre, roots and the like has become attached to the cutting wires 28 and if not removed results in the production of bricks having ragged edges. To obviate this it is necessary to clean the wires 28, after each and every cutting of bricks. The wire cleaner employed (Figures 9, 11 and 17) comprises a horizontal flat bar 68 having therein an incision 68^a for each cutting wire 28, and is adapted when at rest to lay on the table 22 with its upper side slightly below the surface of the latter.

A lower horizontal bar 49 the ends of which work on vertical guide rods 69^a depending from the bar 33 below the cutting table 22, is connected by uprights 70 with the cleaning bar 68 said uprights 70 passing through the bar 33 and the table 22.

Pivotally connected at its upper end to the centre of the lower bar 49 is a link 71 the lower end of the latter being pivotally attached to the lower end of a lever 72 fulcrumed to the table 22 at 72^a so that its upper end projects upwards beyond said table at the end of the latter farthest from the pug mill.

The upper end of the lever 72 has a vertical portion 73 facing the table 22 and an inclined finger 73^a extending downwardly from same.

Pivoted to the column 26 at the opposite end of the machine to the pug mill is a pair of short arms 74 the latter projecting from the column 26 towards the table 22 at a level slightly below the highest point of the upper end of the lever 72.

These arms 74 have mounted between their outer ends a friction roller 74^a and are prevented from falling below a horizontal position by a stop 75 on the column 26. As the cutting table 22 comes to its position opposite the delivery table 23 as shown in Figure 1, the inclined and downwardly extending finger 73^a at the upper end of the lever 72 engages underneath the friction roller 74^a and lifts the outer ends of the arms 74, which when said finger 73^a has passed beneath the roller 74^a drop down one on each side of the upper end of said lever 72 with the roller 74^a engaging the vertical portion 73 thereof.

On the cutting table 22 commencing its return journey back to the stationary stand 13 the lever 72 by reason of its upper end being retained or caught between the arms 74 is caused to swing on the fulcrum 72^a in such a manner that its lower end moves upwards and its upper end downwards. This has the effect of forcing the cleaning bar 68 up the wires 28, which movement continues until such time as the upper end of the lever 72 is depressed sufficiently to draw out from under the roller 74^a, whereupon the cleaning bar 68 drops again to its position of rest on the table 22, and the lever 72 assumes its normal in readiness for again engaging the roller 74^a and arms 74, on the next journey of the table 22 to opposite the delivery table 23.

The cutting table 22 must move by clay column pressure alone until such time as a length of clay has been severed from the column issuing through the die from the pug mill 7 and until this is done the mechanism for propelling said table 22, is not brought into use.

As the length of clay so severed is of the exact length necessary for cutting off a predetermined number of bricks, and in order to effectually do away with waste ends, it is essential that the severing of the length from the issuing column of clay be effected cleanly and exactly at right angles to the clay column. If the cut is not made straight across or exactly at right angles to the column then for every severing cut two bricks will ultimately be spoilt.

The severance of a length of clay from the issuing clay column, cleanly and by means of a cut straight across or at right angles to the column is effected by a single cutter termed a "bar cutter" mounted on the pug mill and of the frame 27 on which are strung the cutting wires 28 said bar cutter operating exactly at right angles to and across the line of travel of the issuing clay column.

As this cutter travels with the tables 22 which until fully loaded with the requisite length of clay does not move at all, and then moves under the pressure of the issuing clay column until the severance has been effected it follows that the severing cut must be straight across and at right angles to the clay column.

The cutting table 22 is propelled from its loaded position next the stationary platform 13 to opposite the delivery table 23 and returned from the latter to the former by a rod 76 operated by a crank disc 77 keyed on a counter shaft 78 driven from the power shaft 31 (Figures 1, 2 and 19 to 25) and although it is provided that the propelling means shall be put out of action during the time that the clay column is advancing on to the table 22 and also while the severed length of clay is being cut into bricks by being forced by the plunger through the cutting wires 28 on to the delivery table 23, means are provided whereby said cutting table 22 is positively locked during both of these operations.

These locking means (Figures 1 and 22 to 25) consist of a pivoted arm 79 mounted on a frame work 80 secured on the push rod 76 and a further pivoted arm 81 mounted on the under portion of the cutting table 22. The arm 79 is formed with a side right angle upper end 79ª and the arm 81 also with a side right angle upper end 81ª, said arms 79, 81 being so located in relation to each other, that the end 79ª of the arm can be made to engage over the end of the arm 81, or vice versa, as the case may be.

Mounted on the crank pin 77ª of the disc 77 is an eccentric 82 so keyed that its longest throw either way is beyond the throw of said crank disc.

The eccentric 82 therefore always throws a little further than the crank disc at the end of each stroke of the latter. The eccentric rod 82ª is pivotally connected to the pivoted arm 79 mounted on the framework 80 carried by the push rod 76. The other pivoted arm 81 has pivotally connected thereto one end of a rod 83 which extends in a line parallel with the line of travel of the clay column, below the cutting table 22 and terminates in an upwardly bent right angle portion 83ª beyond the carrier arm 50 furthest from the pug mill (Figures 1, 2 and 17.)

This upwardly bent right angle end 83ª of the rod 83 is attached by a jointed connection 84 to a horizontal lever 85 pivoted at 86 on a bracket 87 projecting upwards from the frame of the cutting table 22 said lever 85 extending across the end of the table so that its outer end lies in the path of travel of the clay column and between two horizontal fixed stop bars 85ª secured to the frame 27 (Figures 1, 2, 17 and 46).

The locking arms 79 and 81 are operated as follows.

When the cutting table 22 is in position to receive the clay column that is at the stationary platform end of its run, in which position it is partially telescoped under or covered by said platform 13 the crank disc 77 and the eccentric 82 are in the position illustrated in Figure 22. In the latter position both locking arms 79, 81 are inclined towards the crank disc with the upper end 79ª of the arm 79 pivoted to the frame 80 carried by the rod 76 resting on the upper end 81ª of the arm 81 pivoted to the under frame of the table 22.

The crank disc 77 rotates in the direction indicated by the arrows in Figures 22 and 24 consequently with the arms 79, 81 engaged or locked together as described and illustrated in Figure 22, downward movement of the rod 76 cannot occur until such time as the upper end 81ª of the arm 81 is withdrawn from below the upper end 79ª of the arm 79. This withdrawal is effected by the movement of the clay column which advances or slides along the stationary stand 13 on to the cutting table 22 and along the latter until it strikes and moves the outer end of the lever 85 which is projecting from or is slightly in advance on the pug mill side of the stop bars 85ª in a direction away from the pug mill. In order to accommodate the lever 85 in its projecting position just mentioned the end of the plunger 29 furthest from the pug mill is provided with a recess 85ᵇ. Movement of the lever 85 in the direction stated has the effect of imparting similar movement to the rod 83 by reason of the latter's upwardly bent end 83ª receiving a push through the connection 84 from the lever 85, the result being that the upper end 81ª of the arm 81 is withdrawn or pulled from beneath the upper end 79ª of the arm 79. This leaves the rod 76 unlocked, and the cutting table 22 free to move towards the delivery table 23 under the pressure of and with the moving clay column, which impinges against the stop bars 85ª. The table 22 in moving as indicated draws with it the rod 76, and causes the crank disc 77 to turn in the direction indicated. Shortly following the commencement of this movement of the table 22 with the clay column, the bar cutter mounted on the frame 27 on the table 22 is caused to sever the length of clay on the latter, from the remainder of the clay column following which the clutch on the counter shaft 78 is thrown in whereupon the table 22 is propelled by the rod 76 towards the delivery table 23 at a greater speed than that at which the clay column issues. It is not intended however at this point to describe the operation of the bar cutter and the clutch which causes the propulsion of the table 22 to be effected.

When the table 22 reaches the end of its run opposite the delivery table 23, the aforesaid clutch is thrown out, and said table stops. As it is essential that the table 22 should be held immovable during the time the severed length of clay is being forced through the cutting wires 28 on to the delivery table 23, the locking arms 79, 81 require to again be brought into engagement with each other.

It will be remembered that when the upper end $81^a$ of the arm 81 was withdrawn from beneath the upper end $79^a$ of the arm 79, it was pulled away from the crank 77. This movement caused it to come to the position it is shown occupying in Figures 24 and 25. When the cutting table 22 came to a standstill opposite the delivery table 23 the crank disc had assumed the position shown in Figure 24 and it will be observed that the eccentric 82 is thrown beyond the throw of said crank disc 77 the effect of which is that the arm 79 owing to its connection by the rod $82^a$ with the eccentric 82 has been pushed forward away from the crank disc 77 until its upper end $79^a$ is beneath (instead of over as in Figures 22 and 23) the upper end $81^a$ of the arm 81.

On glancing at the direction of rotation of the crank disc 77 it will also be observed, that if the latter continues to turn the rod 76 will move upwards, but owing to the fact that the upper end $79^a$ of the arm 79 mounted on the frame 80 carried by the rod 76 is locked beneath upper end $81^a$ of the arm 81, it is not possible for the rod 76 to rise while the arms 79, 81 are locked together as described and as illustrated in Figures 24, 25.

To effect the release of the arms 79, 81 from the position shown in the last mentioned figures, in order to leave the cutting table 22 free to be drawn by the rod 76 back to its former position right up to and partially telescoped, under the stationary stand 13 the carrier arm 50 of the plunger furthest from the pug mill 7 has attached thereto an outstanding inclined arm $84^a$ (Figures 1, 2). The latter when the plunger 29 has almost completed its forward movement and after the severed length of clay on the table 22 has been cut into bricks by being forced through the wires 28 on the delivery table 23, comes in contact with the upturned end $83^a$ of the rod 83, connected to the arm 81 pivoted on the under frame of the table 22. The inclination of the arm $84^a$ is such that its engagement with the upturned end $83^a$ of the rod 83 causes the latter to be moved towards the crank disc 77, the effect of which is that the upper end $81^a$ of the arm 81 is pushed from under the upper end $79^a$ of the arm 79, and caused to again occupy the position shown in Figures 22, 23. Following on this the clutch on the counter shaft 78 through which the crank disc 77 is operated is again brought into use, and the cutting table 22 drawn by the rod 76 away from the delivery table 23 back to its former position and brought to a standstill at the stationary stand 13 in readiness to again receive the on-coming clay column.

The position of the crank disc 77 on the cutting table coming to a standstill at the stationary platform 13 is as illustrated in Figure 22, and it will be observed from the drawing that the throw of the eccentric 82 is again beyond the throw of said crank disc. This extra throw results in the rod $82^a$ being pulled by the eccentric 82 so that the upper end $79^a$ of the arm 79 pivotally mounted on the frame 80 carried on the rod 76 is again brought over the upper end $81^a$ of the arm 81 whereupon the rod 76 is again locked against downward movement until such time as the end of the on-coming clay column strikes the lever 85 and effects the release of the rod 76 as before described.

The clutch and mechanism for causing the propulsion of the cutting table 22 with a severed length of clay column thereon, from the stationary stand 13 and at a greater speed than that at which the clay column travels, are brought into use mechanically, shortly following the severance of the length of clay from the oncoming clay column. When the cutting table 22 reaches its position directly opposite the delivery table 23, the clutch is mechanically thrown out, while the table is locked as before described, and the severed length of clay cut into bricks and pushed on to the delivery table 23. After this has been done the clutch is again thrown in mechanically to cause the table 22 to be run back to its former position, on reaching which, the clutch is again mechanically thrown out of gear.

This clutch and the mechanism operating in conjunction therewith are illustrated in Figures 1, 2, 20, 21.

On the shaft 31 which is geared with the pug mill 7 drive or is otherwise suitably driven is keyed a bevel wheel 86 which meshes with a bevel wheel 87 integral with or keyed on a sleeve 88 mounted loosely on the counter shaft 78. At the other end of the sleeve 88 and also either integral therewith or keyed thereon is a toothed wheel 89. The bevel wheel 87, sleeve 88, and wheel 89 are driven continuously by the wheel 86 on the shaft 31.

Keyed on the counter shaft 78 next to the wheel 89 is a disc 90 formed with a hub $90^a$ which bears against the wheel 89 so that a space 91 is left between said disc 90 and wheel 89.

On the side of the disc 90 facing the wheel 89 is pivoted a bent rocking pawl on the outer end of one leg 91 of which a friction roller 91ª is mounted. To this leg 91 of said pawl is connected one end of a tension spring 92 which at its other end is attached to a pin 93 projecting from the disc 90, and set to pull in such a direction that normally the friction roller 91ª would bear against the edge of the toothed wheel 89 and finally engage between the teeth thereof.

The other leg 94 of the rocking pawl at all times projects beyond the edges of the disc 90 and wheels 89.

Rigidly secured to the under frame of the table 22 is a horizontal bar 95 projecting towards the counter shaft 78 in a line directly below the leg 94 of the rocking pawl pivoted on the disc 90.

The outer end of this bar is provided with an adjustable fitting 95ª having an upper surface sloping downwards and away from the cutting table 22.

On the frame of the cutting table 22 at the power shaft 31 thereof and clear of the clay column passage is a vertical frame 96. Mounted in bearings 97ª on this frame is a rod 97 (Figures 1, 2, 19 and 21) extending longitudinally of the machine and prevented from moving endways in said bearings by collars 97ᵇ. The pug mill end 98 of the rod 97 is bent upwards and then at right angles towards the pug mill and is located on a line drawn parallel with the travel of the clay column, and passing directly over the bent rocking pawl on the disc 90. A spring 101 having one end secured to the rod 97 and the other end secured to the frame 96, is wound on the rod 97 so that normally it tends to keep the arm 99 at the plunger end of said rod 97 vertical and the bent end 98 horizontal.

The length of the trip rod 97 is such that when the cutting table 22 is in the position shown in Figures 1, 2, that is directly opposite the delivery table 23, the bent end 98 of said rod 97 is slightly on the delivery table side of the centre of the counter shaft 78 and the arm 99 is located at about the plunger carrier 50 nearest the pug mill.

When the cutting table 22 is at the top of its run or right up to and partly telescoped under the stationary platform 13 the bent arm 98 of the trip rod 97 projects over and beyond the disc 90 and toothed wheel 89, while the outer end of the bar 95 projects below the disc 90 and toothed wheel 89 and only slightly beyond the centre of the counter shaft 78. In this position the upper inclined surface of the adjustable fitting 95ª on the outer end of the bar 95 engages the outer end of the leg 94 of the bent rocking pawl on the disc 90 and keeps the arm 97 carrying the friction roller 91ª pulled outwards against the action of the spring 92, and the friction roller 91ª from engaging in the teeth of the wheel 89 which is revolving continuously. The disc 90 and the crank disc 77 both of which are keyed on the shaft 78 therefore while the bar 95 is in the position indicated in Figure 21, do not turn.

Immediately however after the unlocking of the arms 79, 81 has been brought about the table 22 commences to move by clay pressure only towards the delivery table 23 and draws with it the bar 95. The fitting 95ª on the latter thereupon moves away from contact with the leg 94 of the pawl on the disc 90 whereupon the roller 91ª on the end of the leg 97 of the rocking pawl is pulled by the spring 92 into engagement with the teeth of the wheel 89.

This causes the continuously rotating wheel 89 to become locked with the disc 90 which owing to its being keyed on the counter shaft 78 causes the latter to also rotate and drive the crank disc 77 and propel cutting table 22 with the severed length of clay thereon towards the delivery table 23 at a speed greater than that at which the clay column is moving.

By the time the cutting table 22 has reached its position directly opposite the delivery table 23, the trip rod 97 owing to its being mounted on the frame 96 which travels with the cutting table 22, has moved to the position shown in Figure 1 that is with its bent end 98 just over the delivery table side of the centre of the counter shaft 78 and directly in the line of rotation of the leg 94 of the pawl on the disc 90 while the arm 99 at the other end of the trip rod has moved to opposite the plunger carrier arm 50 nearest the pug mill.

Consequently as the projecting leg 94 of the rocking pawl on the disc 90 comes up to its highest position it is caught by the horizontal portion of the bent end 98 of the trip rod 97 and the friction roller 91ª on the other leg 91 is withdrawn against the action of the spring 92 from between the teeth of the wheel 89 thereby bringing about the declutching of the disc 90 from the toothed wheel 89, and rendering the counter shaft 78 again inoperative.

As this declutching is effected when the crank disc 77 and the eccentric 82 are in the positions shown in Figure 24 that is at the extreme limit of their throw towards the delivery table side of the crank disc 77 the locking effected by the arms 79, 81 when the table 22 is opposite the delivery table 23 and the declutching occur simultaneously.

This position of the crank disc 77 is a most suitable one for effecting the declutching of the wheel 89 from the disc 90, as the crank is at dead centre, and there is practically no load on the pawl.

To put the counter shaft 78 into operation again in order to effect the return of the cutting table 22 to the stationary platform 13, a rod 100 (Figures 1 and 19) slidably mounted on the back plate 52 on the plunger 29 is provided. This rod 100 which for the greater part of its length runs parallel with the line of travel of the clay column is slidably connected at one end to the lever 85 (Figure 18) and is bent at its other end to conform approximately to the form or shape of the back plates 52, and is also provided at its bent end with a horizontal projection 100$^a$.

As the plunger 29 returns after forcing a severed length of clay through the wires 28 the bent end of this rod 100 engages the arm 99 on the delivery table end of the trip rod 97, causing the latter to turn in its bearings 97$^a$ against the action of the spring 101 and raise the horizontal portion of the bent end 98 of the rod 97 clear of the projecting leg 94 of the rocking pawl on the disc 90, whereupon the friction roller 91$^a$ on the leg 91 of the rocking pawl again engages in the teeth of the wheel 89 and the counter shaft 78 is again set in motion.

The cutting table 22 is then drawn by the rod 76 back to its starting position and the trip rod 97 and bar 95 caused to again assume the positions shown in Figure 21.

As the projecting leg 94 of the rocking pawl comes around to its lowermost position it strikes the adjustable fitting 95$^a$ on the end of the bar 95 which has again moved up to the position shown in Figure 21 and the friction roller 91$^a$ is withdrawn from engagement with the teeth of the wheel 89 whereupon the disc 90 is again unlocked from the wheel 89 and the counter shaft 78 again rendered inoperative. Here again the declutching is effected at a most suitable time, that is, with the crank disc 77 at dead centre and with practically no load on the pawl.

The next time the end of the clay column strikes the outer end of the lever 85 the end of the rod 100 is pulled from engagement with the arm 99, whereupon the rod 97 turns under the influence of the spring 101, the arm 99 striking the projection 100$^a$ and causing the turning movement to cease and the horizontal portion of the bent end 98 to be left in readiness for re-engaging the leg 94 of the pawl on the disc 90 when the cutting table 22 is again moved to the end of its run opposite the delivery table 23.

It has been found that in order to carry out these movements effectively that it is necessary that the crank disc 77 be provided with a counter weight 77' to balance the weight of the rod 76 and that means be also provided for preventing any tendency of the shaft to reverse, when declutching of the clutch thereon occurs. To guard against the latter contingency a spring pressed pawl 36 is mounted so as to again engage in one of two notches or depressions 36$^a$ in the periphery of the disc 90, simultaneously with the throwing out of the clutch.

The pawl 36 while it allows the disc 90 and shaft 78 to rotate in the direction required, absolutely prevents any reverse turning movement.

The bar cutter (Figures 1, 2, 15 and 16) mounted on the pug mill end of the frame 27 of the cutting table 22 comprises a frame 102 on which is strung between upper and lower members or bars a single cutting wire 103 adapted to be drawn through the clay column at right angles to the latter and to sever therefrom a length of clay from which a predetermined number of bricks can be cut without entailing waste ends.

The upright member of the frame 102 passes between the jaws of a fork 104 secured to the upper horizontal bar of the frame 27 and is pivotally mounted between the points of horizontal set screws 105 passing inwardly through the jaws of the fork 104.

When set ready for severing a length of clay the cutting wire 103 is located on the delivery table side of the clay column and the upright member of the frame on the opposite or power shaft 31 side thereof while the bottom member or bar operates in a cross channel or guide 22$^b$ in the table 22, this cross channel or guide 22$^b$ is necessary in order to prevent the bar cutter from making anything but an exact angle cut through the clay column.

The clay column in advancing or sliding along the cutting table 22 passes between the upright member of said frame 102 and the cutting wire 103.

The bar cutter is spring operated and is set in position against the influence of one or more springs ready to effect the severance of a length of clay when required.

On the power shaft side of the path of the clay column, and located above the plunger 29 is a vertical frame 106. This frame is parallel with the line of travel of the clay column and is attached to uprights 107 arising from the cutting table 22.

On the end of the frame 106 furthest from the bar cutter is a centrally pivoted lever 108 to the lower end of which is attached one end of a tension spring 109 the other end of the latter having connected thereto a flexible wire chain or the like 110 which passes around a horizontal pulley 111 and is attached to the upright member of the bar cutter frame 102.

To the upper end of the lever 108 is connected one end of another tension spring 112 the other end of which is connected to a hooked bolt 113 adjustable by means of a wing nut 113$^a$ through the turned end 106$^a$ of the frame 106.

When the bar cutter is set in position shown in Figure 15 of the drawing the springs 109, 112 are both in tension and when the cutter is released they draw the wire 103 through the clay column on a line at right angles thereto.

By arranging the frame 106 carrying the lever 108 and springs 109 and 112 as shown and leading the wire chain or the like 110 around the pulley 111, so that the pull of said springs is directly at right angles to the clay column, space is saved, the bar cutter operating mechanism is placed out of the road, and the severing of a length of clay from the column is performed just as efficiently as if the springs 109, 112 operated at right angles to the column.

The means for retaining the bar cutter in its set position until such time as it is required to operate, comprises a centrally pivoted catch 114 operating horizontally on the table 22 as at 114'.

At the rear end of the catch 114 a tension spring 114ª is provided the latter being attached at one end to a pin 115 on the table 22 and at the other end to the rear end of the catch 114. This spring 114ª exerts itself in a line at right angles to the length of the catch 114 and normally keeps the forward or bar cutter engaging end thereof pulled over against a stop 116 and directly behind the lower end of the upright member of the frame 102 thereby retaining the bar cutter in its set position against the pull of the springs 109, 112.

The other side of the rear end of the catch 114 is connected to one end of a chain 117 the other end of which is connected to the upper end of an arm formed by providing an extension 118 from the frame 80 rigidly affixed to the rod 76 which propels and draws the cutting table 22 to and from the delivery table 23 (Figures 22, 24).

The chain 117 is of such a length that there is practically no slackness when the arm 118 occupies the position shown in Figure 22.

It must here be remembered that it is essential that the bar cutter should not operate until the cutting table 22 is moving towards the delivery table 23 under the influence of and at exactly the same speed as the issuing column of clay.

As before stated the pressure of the end of the clay column against the lever 85 on the cutting table 22 withdraws the upper end 81ª of the arm 81 from beneath the upper end 79ª of the arm 79 and effects the unlocking of the rod 76, whereupon the cutting table 22 commences to move with and under pressure of the clay column in the direction of the delivery table 23, dragging with it the rod 76 and causing the crank disc 77 to turn with the counter shaft 78 in the direction indicated.

The lowering of the crank disc end of the rod 76 causes the upper end of the arm 118 to move slightly towards the counter shaft 78 and exert a pull on the chain 117 which draws the forward end of the catch 114 to one side of the lower end of the upright member of the bar cutter frame 102 leaving the latter free to operate and the cutting wire 103 to be drawn through the clay column by the action of the springs 109, 112.

Simultaneously with the severing of a length of clay from the column a row of knife blades 173 is caused to descend and bite into the severed length (Figure 15).

The blades 173 are attached to flat metal strips 173ª bolted to a horizontal flat bar 174 having rounded ends which are entered in brackets 175 on the uprights 107 of the cutting table.

The rounding of the ends of the bar 174 forms shoulders whereby said bar is prevented from moving endways in the brackets 175.

By providing the strips 173ª with cross slots 176, Figure 16, the knife blades 173 can be adjusted sideways on the bar 174. The knife blades 173 project across the path-way of the clay column, from the plunger side thereof and are mounted so that when they are horizontally disposed, they will bite into the upper edge of the clay column. There are provided the same number of knife blades 173 as there are cutting wires 28, one exactly opposite each of the latter and all of the blades are raised and lowered together by turning the bar 174 in its brackets 175 as follows:

On the bar cutter end of the bar 174 is fixed a double armed fitting 177, the arms of which project downways one on each side of a stud 178 projecting from the bar cutter frame 102. As the latter operates to force the wire 103 through the clay column the stud 178 strikes the inner side of the arm of the fitting 177 on the plunger side of the bar 174 and turns same sufficiently to cause the blades 173 to enter the upper edge of the clay column. When the bar cutter is being reset, the stud 178 strikes the other arm of the fitting 177 and causes the bar 174 to turn and lift the blades 173 high enough to clear the upper edge of the clay column as a fresh portion of the latter again comes beneath it.

The biting of the knife blades 173 into the severed length serves a double purpose, it holds the severed length firmly and securely against end movement on the cutting table 22 while the latter is being started, run to the delivery table stopped opposite the latter, and while the severed length is being forced through the wires 28. There is an absolute safeguard against end movement of the severed length on the cutting table, as if end movement occurred, the two end bricks would be one larger and one smaller than the intermediate bricks and would therefore be wasted. Further the incisions made by the entry of the blades 173 into the upper edge of the column combined with the fact that said blades remain entered in the clay while the latter is being forced through the cutting wires 28, prevent the edges at the sides of the cuts at the top of the column, or heads of the bricks from tearing or becoming ragged.

Shortly following this as before mentioned the clutch on the counter shaft 78 is brought into action and the cutting table 22 with its severed length of clay thereon is speeded up or propelled to the delivery table 23 at a greater speed than that at which the clay column moves, and finally comes to rest and is locked opposite said delivery table.

The resetting of the bar cutter is brought about by the movement of the plunger 29 near the end of the latter's stroke in forcing the severed length of clay through the cutting wires 28. As said plunger 29 advances a protection 29ª Figure 16 on its end nearest the bar cutter catches behind the upright member of the frame 102 and pushes the cutter against the action of the springs 109, 112, into its waiting or set position as shown in Figure 15 of the drawings. As soon as the bar cutter reaches the latter position the forward end of the catch 114 is pulled by the spring 114ª behind the lower end of the upright member of the frame 102, and holds the bar cutter in its set position.

The rod 76 which propels the cutting table 22 to the delivery table or position and returns it from the latter to the stationary platform, can be fitted with means for absorbing shock or jarring occasioned by the sudden stoppage of the cutting table at the delivery position, which if the machine is working at high speed has a tendency to cause movement of the severed length of the cutting table 22.

In fitting said shock absorbing means the crank end 76ª of the rod 76 is solid and slidable in the other portion which is hollow (Figures 42 and 43). The solid portion 76ª has fixed therein cross pins 179 and 179ª which project through slots 180 in the hollow portion and slots in collars 182 and 182ª fixtures on the hollow portion 76 one at the end of the latter and the other a short distance from the end. The slots 181 in the collars 182 and 182ª open through the inner ends of the latter, between which a strong spiral spring 183 in compression and surrounding the hollow portion of the rod 76 is placed.

When the cutting table 22 is coming to a standstill at the end of its run from the stationary platform 13 to the delivery table 23, it pulls on the hollow portion 76 and compresses the spring 183 between the collar and pin 179ª said spring absorbing the shock or jar, and when said table is coming to a standstill at the end of its run in the opposite direction the spring 183 is compressed between the other collar 182ª and pin 179.

The plunger 29 which forces the severed length of clay through the wires 28 on to the delivery table 23 is operated and brought into use mechanically by the mechanism now to be described (Figures 1, 2, 31 and 32).

Mounted across the arms 30 of the cutting table 22 near to and parallel with but slightly below the level of the power shaft 31, is a smaller shaft 119 supported in bearings 120 bolted to the arms 30.

Keyed on said shaft 119 one at each end thereof are balanced crank discs 121 connected by push rods 122 with the plunger 29.

The rods 122 are provided with adjusting means 122ª whereby their length can be increased or shortened as required.

On the power shaft 31 and between the bearings 30ª at the ends of the arms 30 is a sleeve 123 formed integral with or on which is keyed a toothed wheel 124. The sleeve 123 is fitted internally with a feather key 125 which is slidable in a key way 126 cut in the power shaft 31.

The bearings 30ª and the sleeve 123 are all slidable on the power shaft 31, while the sleeve 123 also rotates with it.

Loosely mounted on the small shaft 119 is a sleeve 127 which has on one end a toothed wheel 128 either formed integral therewith or keyed thereon, and at the other end a dog toothed wheel 129 also either formed integral therewith or keyed thereon. The toothed wheel 128 meshes with the toothed wheel 124 on the sleeve 123 slidably mounted on and rotating with the power shaft 31. The sleeve 123 and the wheels 124 and 128 are therefore driven continuously from the power shaft 31.

Keyed on the small shaft 119 next to the dog tooth wheel 129 is a clutch disc 130 formed with a hub 130ª which bears against the dog tooth wheel 129, so as to provide a space between the latter and said disc.

In the space between the disc 130 and the wheel 129 is a rocking pawl which is pivoted to the disc.

This pawl carries at one end of one leg 131 a friction roller 131ª which normally tends to engage in the teeth of the dog tooth wheel 129, owing to the action of a tension spring 132 connected at one end to the pawl on the friction roller side of the pivot and at the other end to a pin 133 on the disc 130.

The other leg 134 of said pawl projects beyond the dog tooth wheel 129 so as to in the course of the rotation of the disc 130 come in contact with the upper end of a swinging trip rod 135 pivoted to a frame 136 depending from the arms 30.

The trip rod 135 is at its lower end 135ᵃ given a short bend towards the pug mill and a further short bend in the direction of the cutting table 22 while its upper end is located at a level slightly above the bottom of the dog tooth wheel 129.

The trip rod 135 is weighted or made heavier at its lower end than at its upper end, so as to normally assume a vertical position.

On the ground or the bed of the machine and at a point slightly towards the pug mill side of the position the lower end of the swinging trip rod 135 occupies, when hanging vertically, with the cutting table 22 directly opposite the delivery table 23 is an inclined surface which increases in height from the pug mill end of the machine towards the delivery table end thereof.

This inclined surface is provided with a plate 137 having along one edge a vertical side 137ᵃ through the top of the highest end of which and a vertical plate 138 secured to the ground or machine bed and shaped to accommodate said inclined plate, a pivot pin 139 is passed horizontally.

As the cutting table 22 with its severed length of clay column thereon is propelled from the stationary platform 13 to the delivery table 23, the trip rod 135 is hanging vertically with the leg 134 of the rocking pawl engaged on its upper end, so that the friction roller 131ᵃ is kept out of the teeth of the dog tooth wheel 129 and the shaft 119 is therefore idle.

Just before the cutting table 22 nears the end of its run to the delivery table 23, the lower end 135ᵃ of the swinging trip rod 135 strikes the inclined surface of the plate 137, and is retarded or held back as the cutting table 22 moves onwards. This causes the upper end of the trip rod 135 to move in the opposite direction and just at the moment the cutting table 22 comes to a standstill and is locked opposite the delivery table 23 the upper end of said rod 135 slips from beneath the leg 134 of the rocking pawl, whereupon the spring 132 attached to the latter immediately pulls the friction roller 131ᵃ into engagement with the tooth of the dog tooth wheel 129 and the disc 130 and wheel 129 become locked together and the small shaft 119 commences to rotate.

Immediately following the moving of the upper end of the trip rod 135 from under the leg 134 of the rocking pawl the lower end 135ᵃ of said trip rod passes over the highest point of the plate 137 and again assumes a vertical position with its upper end directly in the circular path of travel of the projecting leg 134 of the rocking pawl.

One complete revolution of the shaft 119 is all that is required to cause the crank disc 121 and rods 122 to push the plunger 29 forward sufficiently to force the severed length of clay column through the cutting wires 28 on to delivery table 23, and return the plunger to its starting position.

As the shaft 119 completes its revolution the projecting leg 134 of the rocking pawl strikes the upper end of the now righted rod 135 whereupon the friction roller 131ᵃ is withdrawn from its engagement in the teeth of the dog tooth wheel 129 and the shaft 119 is again rendered inoperative.

As the cutting table 22 returns to the stationary platform 13, the inwardly bent right angle end 135ᵃ of the swinging trip rod 135 passes below the inclined plate 137, which being pivoted as shown in Figures 31, 32 lifts to allow said end 135ᵃ to pass and then drops again in readiness to present its inclined surface to the bent end 135ᵃ of the rod 135 on the next run of the cutting table 22 down to the delivery table 23.

The delivery table 23 (Figures 1 and 33 to 36) stationed directly opposite the lower stop or cutting position of the table is constructed, arranged and operated so as to receive on its surface up-ended bricks in rows parallel with the plunger 29, the table being provided with mechanism whereby rows of bricks formed at right angles to the plunger and the line of travel of the cutting table and clay column can be either parallel with each other throughout their length, or be given a zig-zag formation.

In constructing the delivery table an inner frame 140 of angle iron having its horizontal web or flange uppermost is secured inside and to an outer angle iron frame 141, the latter having its horizontal flange or web lowermost. At the top and bottom edges of the table or those edges parallel with the cutting table 22, the horizontal flanges or webs of the frame 41 are dispensed with.

The upper edge of the vertical flange or web of the outer frame 141 projects above the horizontal flange or web of the inner frame 140.

The two frames 140, 141 are mounted on and secured to two horizontal flat bars 142 located one on each side of a centre line drawn across the frames parallel with the cutting table and the line of travel of the clay column. The ends 142ᵃ of these flat bars 142 are turned upwards and incline towards each other so as to meet directly over the centre line before mentioned. For the junction of these upwardly bent and inclined ends 142ᵃ trunnions 143 project outwards and rest in bearings 144 mounted on pedestals 145. At the outer ends and beyond the bearings 144 and pedestals 145, the trunnions 143 are squared and tapered to each take a vertical handle 146 formed to slip thereon.

Horizontal flat bars 147 parallel with the cutting table 22 and the line of travel of the clay column, rest at their ends on the horizontal flanges or webs of the inner angle iron frame 140 disposed at right angles to the cutting table.

The ends of these flat bars 147 are reduced and project through horizontal slots 147$^a$ in the vertical flange or web of the outer angle iron frame 141, and outside the latter said ends are connected by bars 148.

The flat bars 147 are therefore capable of being slid together on the horizontal flanges of the inner frame 140 towards or from the top and bottom of those edges of the table 23 parallel with the cutting table 22 and the line of travel of the clay column.

Mounted crossways below said table 23 and directly beneath the aforesaid centre line thereof is a rod 149 on each end of which is keyed a handle 150, which projects upwards outside the connecting bar 148. Each of the latter has a pin 148$^a$ projecting outwardly therefrom and entered in a vertical slot 150$^a$ in a handle 150, so that by moving either of the latter to one side or the other, the flat bars 147 can be slid together in the desired direction on the inner angle iron frame 140. Both handles 150 are not necessary but two are provided one at each side of the table 23 in order that the flat bars 147 may be operated by the attendant no matter at which side of the table he may be when the operation becomes necessary.

Crossways on the flat bars 147 or side by side on and at right angles thereto are the spreader plates 151. These consist of castings of inverted channel cross section each provided with a cross web 151$^a$ near each end and directly over the flat bars 147.

The sides of the inverted channels are cut away at each end (Figure 36) to permit the tops of the castings to rest and slide when required on the vertical flanges of the outer angle iron frame 141 at the top and bottom of the table.

Projecting downwards from each cross web 151$^a$ of each spreader plate 151 is a stud 152, whereby two rows of downwardly projecting studs 152 are provided across the table 23 from side to side one towards the top thereof and one towards the bottom.

The studs 152 of each row are entered in separate inclined slots 153 in the flat bar 147 directly beneath and below the latter are fitted with washers and split pins 154.

The inclination of the slots 133$^a$ is such that all the slots on one side of a centre line drawn from the top to the bottom edges of the table, slope outwardly towards the table side, while all the slots on the opposite side of the aforesaid centre slope outwardly towards the opposite side of the table.

The degree of inclination or slope of the slots 153 is not the same in all cases the slots nearest the centre line having the least inclination while outwards from the centre line to a table side each succeeding slot has more incline and is longer than its predecessor.

The two studs 152 of each spreader plate 151 are entered in two slots 153 (one in each of the flat bars 147) both of the same length, both inclining in the same direction and both having the same degree of inclination.

By these means, when the flat bars 147 are slid on the inner angle iron frame 140 by moving one of the handles 150, it will be found that all of the spreader plates 151 move together, those on the right hand side of the centre line drawn from the table top to the bottom, moving towards the right hand side of the table 23 and those on the left hand side of said centre line towards that side of the table.

Owing to the two studs 152 of each plate 151 being entered in exactly similar slots 153 (one in each of the flat bars 147) the plates 151 at all times remain parallel with each other and the delivery table sides and at right angles to the cutting table 22 and the line of travel of the clay column.

Also as the slots 153 actuating each plate incline at different angles, then the plates 151 do not all receive the same amount of movement, the two centre plates 151 both moving the same distance from the centre line, the second plates from each side of said centre line both moving the same distance which is however greater than the distance the centre plates move, and so on.

Outwards from the centre line, the corresponding plates 151 on each side thereof move the same distance, but always a greater distance than the preceding plates.

The result of this movement is that when the plates 151 are opened out, they are evenly spread, so as to leave spaces between the plates.

At the bottom edge of the table or that edge of the latter furthest from the cutting table 22 there are provided two vertical arms 154, one at each side thereof. These arms are provided with a cross bar 154$^a$ for supporting an off bearing board 155 on edge ready to receive the load of brick from the table.

The off bearing board 155, Figure 39, has longitudinal spaces therein and is slightly greater in length than a cutting of bricks to allow for the opening out of the latter, and is equal to a brick length in width or height. Two cross battens 155$^a$ are nailed on the back of the board 155 which when placed on the delivery table is placed with these battens facing and between the vertical arms 154.

On a severed length of clay column being forced through the cutting wires 28 and cut into bricks on end, the row of the latter so formed, is pushed by the plunger 29 on to the delivery table 23, one brick on to the top end of each of the spreader plates 151 at present closed or together.

As the next cutting or rows of bricks emerges from between the wires 28, it pushes the preceding row farther on to the table and along the length of the plates 151, the third cutting or row pushing the two preceding rows and so on until there is only left sufficient room for another row.

By this time it will be seen that in pushing the cuttings of bricks on to the delivery table, that each spreader plate 151 will have thereon a row of bricks at right angles to the cutting table.

One of the handles 150 is then gripped and moved to operate the flat bars 147 so as to cause the plates 151 to spread or open out, thereby providing parallel spaces between the rows of bricks disposed at right angles to the cutter table 22.

The last cutting or row of bricks is then pushed on to the table, but are not opened out, they being left close together in order to act as a tie to the load of bricks on the table as will be described later.

The barrow 156 (Figures 37–38) of special design and construction so as to be able to take off and bear away without loss of time each table load of bricks, is here brought into use.

The barrow frame is similar in design to the type of frame on barrows in general use in grain sheds, flour mills and the like. In this case, however, the barrow has closely boarded bottom at the front end of which two vertical arms 157 are provided.

The frame is mounted on running wheels 158 secured on an axle 159 held in bearings 160 slidably held in vertical guides 161 attached to the underside of the frame at each side, a short distance from the front end.

Compression springs 162 placed between the bearings and the tops of the guides 161 absorb any shock occasioned by the barrow running over obstructions or inequalities.

Across the lower side of the front end of the frame another axle 163 is mounted and on the latter are provided a pair of smaller wheels 164 of such a size and so positioned that they serve as rollers in tipping the barrow 156 to a vertical position to stand on the arms 157, or in bringing the barrow from the vertical to the horizontal position. The barrow is also provided with the usual handles 158 and legs 159' near the latter. When transferring a load of bricks from the delivery table 23 to the barrow 156 the front end of the latter is presented to the table. A handle 150 of the latter is then pulled away from the cutting table 22, whereupon the end of the table with the arms 154 thereon swing downwards. At the same time the arms 157 of the barrow 156 are inserted beneath the off bearing board 155 on the table, so as to come between the cross battens 155$^a$.

Simultaneously the delivery table 23 with its load and the barrow 156 are brought to the vertical the former with off-bearing board 155 lowermost, and the latter so as to stand on its arms 157.

By then pulling on the barrow handles 158 and using the small wheels 164 as a fulcrum the barrow arms 157 are raised beneath the off bearing board 155 to take the weight of the load whereupon the barrow 156 is gradually brought back to the horizontal with the load of bricks resting on end of the barrow bottom, but now on the ends which were uppermost when on the delivery table 23, and with the closed row of bricks at the handle end of the barrow.

Immediately the load is clear of the delivery table 23 the latter is returned to its horizontal position.

The load of bricks can then be transported where required and set down on the off bearing board 155, leaving a stack of bricks on the flat as shown in Figure 40. The battens 155$^a$ on the off bearing boards 155 facilitate the withdrawal of the barrow arms 157, and also allow air to pass freely beneath the board, and up through the openings therein and the vertical spaces between the rows of bricks.

By leaving the bricks of the last cutting or row pushed on to the cutting table 23 close together as illustrated, the load of bricks is stabilized or held together during its handling and when standing.

If however it is desired that the joints between the bricks of the cuttings or rows should be cross jointed and this certainly gives increased stability to the load additional mechanism is required to bring about this result.

The bearings 144 in which the delivery table trunnions 143 rest are each secured on a flat plate 160. Each of the latter rests on a roller 161 mounted on the top of a pedestal 145 by having its ends reduced and entered in ball case bearings 162 held in the eye of a fitting 163 passing downwards through the top of the pedestal 145 and provided with upper and lower nuts by adjusting which, the bearings 162 can be raised or lowered as desired.

The rollers 161 are horizontal and are disposed parallel with the sides of the delivery table.

About midway of the length of each roller 161 a circumferential groove 161$^a$ is cut therein, in the top of which engages a cross rib 164 on the underside of the plate 160 resting on the roller.

Owing to the engagement of these cross ribs 164 on the plates 160 in the circumferential grooves 161$^a$ of the rollers 161 the plates 160 although capable of movement sideways on the rollers 161 cannot move endways thereon, so that resistance is provided to the thrust of the plunger 29 as cuttings or rows of bricks are pushed on to the delivery table 23.

On the crank or counter shaft 78 is keyed a sprocket 165 (Figure 1) which drives through an endless chain 166 a further sprocket wheel 167 exactly twice the diameter of the wheel 165 and mounted on a shaft 168 parallel with the shaft 78 and supported in bearings mounted on the machine bed, or secured to the supports of the permanent stand 13 (Figure 6). On the end of the shaft 168 and on the delivery table side of the line of travel of the clay column is keyed a short crank 169 to which one end of a connecting rod 170 is pivotally attached said rod passing upwards and being pivoted at its upper end to the lower leg of a bell crank lever 171 mounted vertically on the upper portion of the frame of the stationary platform 13.

To the other leg of the bell crank lever 171 is connected one end of a rod 172 which passes towards the delivery table 23 parallel with and a short distance from the stationary platform 13 and cutting table 22. At its other end said rod 172 is bent at right angles and secured to the projecting end of the nearest trunnion 143 of the delivery table 23.

The operation of this mechanism for effecting the cross jointing of the bricks is as follows.

In order to cause the cutting table 22 to run from the stationary platform 13 to the delivery table 23 the crank shaft 78 makes two distinct half revolutions therefore the sprocket wheel 165 during an up and a down run of the cutting table 22 makes one revolution. The sprocket wheel 167 which has a diameter equal to twice the diameter of the wheel 165 during this cycle is only given half a turn and the crank 169 on the shaft 168 is similarly only given a half turn. Each half turn of the crank 169 causes the rod 172 to be moved in one direction only, consequently it takes two half turns of the crank 169 and two complete turns of the shaft 78 to cause the delivery table to move side ways on the rollers, in one direction and to be returned to its original position.

As the shaft 78 does not turn when the cutting table 22 is stationary side or lateral movement of the table 23 on the rollers 161 only occurs when the cutting table 22 is travelling and not while a cutting or row of bricks is being pushed on to the delivery table 23.

After the first cutting or row of bricks has been pushed on to the table 23, the cutting table 22 is returned to the stationary platform 13, this is equal only to a half turn of the crank shaft 78 and consequently the delivery table 23 receives only a slight side movement on the rollers 161 either to the right or left. As the cutting table 22 runs down again to the delivery table 23, the shaft 78 makes another half turn and the delivery table 23 completes its movement in the same direction as it moved as when the cutting table 22 was running up to the stationary platform 13. Therefore when the next cutting or row of bricks is pushed on to the delivery table, each brick will cross a joint between the bricks of the row already on the delivery table.

In this connection it is to be understood that pressure effecting the movement of the clay bar from the pugmill is temporarily overcome upon the locking of the cutting table. It is to be also understood that the means which effects the movement of the cutting table from the receiving position to the cutting and delivery position acts at a much greater speed in operation than the flow or passage of the material from the pugmill.

The next up and down run of the cutting table or a full turn of the crank shaft 78 results in the delivery table 23 being returned in its former position by two movements so that the bricks comprising the next cutting or row pushed on to the table will then cross the joints of the previous row.

In short, after each cutting or row of bricks is pushed on to the delivery table 23 and before the next cutting or row is pushed on, the table 23 is moved to one side and before the following row is pushed on it is moved over to the reverse side.

The amount of overlap of the bricks is governed by the throw of the crank 169 on the shaft 168.

When the delivery table 23 is fully loaded it will be found that the rows of bricks at right angles to the cutting table 22, and the line of travel of the clay column instead of being parallel with each other will be zig-zagged.

These zig-zagged rows can then, provided the overlap of the bricks is not too pronounced, and care will naturally be taken to see that this is not so, be spread or opened out by the operation of the spreader plates 151 after which the load with its off bearing board 155 is transferred from the table 23 to the barrow 156 and deposited where required as before described, leaving a pile of bricks stacked as shown in Figure 41.

When it is desired to omit the cross jointing of the bricks, the mechanism for effecting the side or lateral movement of the delivery table is put out of action, by removing the chain 166 or disconnecting some other part.

The load of bricks instead of being transferred on to the barrow 156, may be tipped on to a truck 184 running on rails 185 running beneath the delivery table 23 and at right angles to the length of the machine (Figures 1 and 2).

The height of the truck 184 must come just within the radius of the bottom swing of the arc of the delivery table 23 or slightly higher so that as a load of bricks is swung over the off bearing board 155 with its load comes in contact near the lowest point reached in its swing, with the floor of the truck, and the load is left standing upright thereon.

The delivery table is swung a little farther back to give clearance, and the truck 184 pulled a little forward on the rails 185 from under the delivery and cutting tables.

Whereupon the delivery table immediately reassumes its horizontal position awaiting another load of bricks.

This process is continued as boardfull after boardfull of bricks is deposited on the trucks until the latter is filled when it is removed and replaced by an empty truck.

The trucks run on tracks laid in parallel rows up and down the drying sheds. If artificial drying be used then the bricks may be left on the trucks to dry or if atmospheric air drying be the system in vogue then the carload of bricks may be lifted off the truck and placed along the drying sheds, by means of the barrow 156.

Each truck 184 can be provided with a special raising and lowering platform 186 and the railed tracks 185 can have raised ledges 187 on each side (Figure 44). The truck can be run between these ledges 187 and the whole load lowered on to same, after which the truck can be withdrawn leaving the stacks of bricks to dry, with considerable air space between them. When the bricks are dry and ready to go into the kiln, the truck is run beneath the load and the latter picked up by raising the platform 186.

At the mouth of the kiln, or kiln wicket, the truck 184 may be run right into the setters face with its load of bricks, or if this is not desirable it can stop at a special unloading platform 188 (Figure 45).

The platform 188 has an inclined upper surface running from the ground level up to a height equal with the floor of the truck 184 as shown.

The truck 184 is run up against the high end of the platform, after which the stacks of bricks on the truck 184 can be picked off, boardfull by boardfull by the off bearing barrow 156, and run into the setter face and there disposed of. When the bricks are dry the trucks can be loaded up again by running the barrow 156 up the platform 188.

When barrows 156 are used either for off bearing bricks directly from the delivery table 23, or elsewhere, smooth running pathways of concrete, asphalt, brick, boards or the like are provided.

I claim:

1. A brick forming apparatus including in combination a pugmill, a bar forming die associated therewith, a travelling cutting table for accommodating the bar, a stationary stand between the table and the die and adapted to be partially telescoped by the cutting table, a cutter for acting on the bar on the table, a brick cutting frame mounted on the table, a plunger for acting on the severed portion of the bar on the table for forcing the bar through the frame, a movable delivery table for receiving the cut bricks, means for synchronously actuating the cutting and delivery tables and the plunger, and conveying means for receiving the bricks from the delivery table.

2. A brick forming apparatus including in combination a pugmill, a bar forming die associated therewith, a stationary stand adjacent the bar forming die for accommodating the bar, a slidably mounted cutting table movable toward and from and in alignment with the stand and adapted to partially telescope the stand, a cutter for acting on the bar on the table, means for propelling the cutting table, means interposed between the propelling means and the cutter for controlling the operation of the cutter in timed relation with respect to the movement of the cutting table, a wire cutting frame mounted on the table, a movable delivery table arranged at right angles to the path of movement of the cutting table, a plunger also mounted on the cutting table for acting on the severed portion of the bar on the table for forcing the bar through the frame and for forcing bricks thus formed on the delivery table, means for releasably locking the propelling means so as to hold the cutting table immovable during the time the clay bar is advancing to the table and also when the severed bar is being cut into bricks, means for actuating the delivery table in synchronous relation with respect to the cutting table and the plunger, and conveying means for receiving the bricks from the delivery table.

3. A brick forming apparatus for dealing with an issuing clay bar including a reciprocal cutting table which receives a portion of said clay bar and is adapted to be propelled forward by the clay bar, means for causing the said table with a severed length of clay thereon to be propelled at greater speed than that of which the clay bar issues to a cutting and delivery position, a bar cutter mounted on the table, means interposed between the propelling means and the cutter for effecting the severing of the clay bar on the table by the cutter while the bar and the table are travelling at the same speed, substantially as and for the purposes set forth.

4. A brick forming apparatus as claimed in claim 1 wherein one edge of the table is provided with a series of incisions and wherein the brick cutting frame has one bar positioned beneath the table and the other bar above the table, a plurality of cutting wires, coacting means on the wires and bars for effecting engagement therebetween, means for tensioning the wires, manually operable means for effecting a quick release of the wires, and a thrust resisting bar mounted horizontally in said frame above the plunger.

5. A brick forming apparatus for dealing with the issuing clay bar including a die through which the bar issues, a travelling cutting table, a stationary stand located between the die and the table, the table being mounted to partially telescope under said stand when in position to receive a portion of the clay bar, and side walls provided on the portion of the table telescoping under the platform.

6. A brick forming apparatus for dealing with an issuing clay bar according to claim 5 wherein the portion of the cutting table telescoping under the stationary platform is provided with side walls and wherein the side walls are secured on the cutting table to ride over the stationary platform.

7. A brick forming apparatus as claimed in claim 1, wherein the delivery table is tiltable in the direction of right angles to the movement of the cutting table and is shiftable from side to side and parallel with the direction of movement of the cutting table so as to facilitate the arranging of bricks in stacked formation thereon.

8. A brick forming apparatus as claimed in claim 1, wherein the delivery table is provided with spreader plates operable subsequent to the reception of the row of bricks thereon for spacing the plates and wherein the means for operating the table synchronously with respect to the operation of the cutting table serves to shift the delivery table transversely of its axis to further facilitate the reception of bricks thereon in stacked formation.

9. A brick forming apparatus as claimed in claim 1, wherein the delivery table includes a frame, trunnions projecting from opposite sides thereof, bearings in which the trunnions are journalled, plates carried by the under surface of the bearing, spaced standards, rollers journalled in the standards upon which the plates rest so that the table may be shifted transversely of the axes of the trunnions, and cooperative means provided on the plates and rollers for preventing longitudinal movement of the delivery table when bricks are being forced thereon by the plunger from the cutting table.

10. Brick forming apparatus including in combination a pugmill, a bar forming die associated therewith, a travelling cutting table, a stationary stand between the die and the cutting table and adapted to be partially telescoped by the table during the movement of the latter, a delivery table arranged on one side of the cutting table, a reciprocal plunger arranged on the opposite side of the cutting table and positioned opposite the delivery table, a wire cutting frame carried by the cutting table on the delivery table side thereof, a cutter bar for severing a portion of the clay bar, actuating means for synchronously operating the cutting table and the plunger, said actuating means including means for holding the cutting table immovable during the time the clay bar or column is advancing on to the cutting table and also while the severed portion of the bar is being cut into bricks by the action of the plunger on the cutting frame.

11. A brick forming apparatus as claimed in claim 10, wherein trip means is associated with the plunger operating means for throwing the latter into operation upon the arrival of the cutting table into a cutting and delivery position.

12. A brick forming apparatus including in combination a pugmill, a bar forming die associated therewith, a stationary stand adjacent the bar forming die for accommodating the bar as it issues from the die, a delivery table arranged in spaced relation to the stand, a travelling cutting table movable back and forth from the delivery table to the stand and adapted to partially telescope the stand, a wire cutting frame carried by the cutting table on the side adjacent the delivery table, a reciprocal plunger mounted on the cutting table and positioned opposite the wire cutting frame, and actuating means for synchronously operating the cutting and delivery tables and the plunger.

13. A brick forming apparatus as claimed in claim 12 wherein the cutting frame includes a plurality of tensioned cutting wires strung across the frame and manually operable means for quickly releasing any one of the wires.

14. Brick forming apparatus as claimed in claim 12 wherein the cutting frame is of a rectangular formation and has one bar positioned beneath the cutting table and formed with a series of spaced projections, a plurality of vertically tensioned hooks arranged through the upper bar, cutting wires engaged with the projections and the hooks, a horizontal bar arranged in the frame and provided with a spaced series of right and left hand communicating threads for engagement with the cutting wires whereby the wires may be adjusted relatively to each other upon the turning of the said bar and an indicating bar mounted in the frame for facilitating the adjustment of the wires.

15. Brick forming apparatus as claimed in claim 12 wherein the wire cutting frame is of a rectangular configuration and has the lower horizontal bar arranged beneath the cutting table, a series of independently releasable and tensioned cutting wires arranged in the frame and a horizontally disposed wire cleaning bar resting upon the upper portion of the cutting table and provided with means for embracing the wires, vertical guide rods suspended from the cleaning bar and slidably arranged through the lower bar frame, a horizontal bar slidably suspended from the lower horizontal bar of the frame and connected with the side bars, a lever fulcrumed to the wire cutting frame and operably connected with the last mentioned horizontal bar and cooperative engaging means on the lever for effecting a vertical movement of the cleaning bar relative to the wires during certain movements of the cutting table.

16. Brick forming apparatus as claimed in claim 12 wherein a toothed frame is employed for mounting the plunger to ensure of positive movement thereof and wherein the forward edge of the plunger is provided with inwardly extending recesses the side walls of which diverge towards the inner ends for coacting with the cutting wires for facilitating an effective cutting of the severed portion of the clay bar during operation of the plunger.

17. Brick forming apparatus as claimed in claim 12 wherein the means for locking the travelling cutting table in its clay bar receiving position includes a cutting table push and draw bar, an arm having a bent push over end pivoted on the cutting table push and draw bar, another arm having a bent over end pivoted on the cutting table, a disc operating said push and draw bar, an eccentric mounted on the crank pin of the disc operating said push and draw bar so as to go beyond the end of the stroke of said cutting disc when the cutting table is drawn to its clay bar receiving position and a connecting rod from said eccentric to the arm pivoted on the push and draw bar adapted to pull the bent over end of said arm over the upper bent end of the arm pivoted on the cutting table, substantially as and for the purposes set forth.

18. Brick forming apparatus in accordance with claim 12 wherein the means for locking the travelling cutting table in its cutting and delivery position and its clay bar receiving position comprises a cutting table push and draw bar, an arm having a bent over end pivoted on the cutting table push and draw bar, another arm having a bent over end pivoted on the cutting table, a disc operating said push and draw bar, an eccentric mounted on the crank pin of the disc so as to go beyond the stroke of said cutting disc as the clay bar is drawn to its receiving position, a connecting rod associated with the eccentric and the arm pivoted on the push and draw bar and adapted to be bent over said arm on the upper bent end of said cutting table, and the bent over end of the arm pivoted on the push and draw bar being also adapted to be pushed below the bent over end pivoted on the cutting table by the eccentric going beyond the disc at the end of the latter stroke as it propels the table to a cutting and delivering position, substantially as and for the purposes set forth.

19. In brick forming apparatus, a cutting table plunger provided with vertically arranged cutting wire receiving slits which open rearwardly into spaced voids which increase in width rearwards and taper downwardly, and adjustable face plates on the plunger the openings between which open into the space voids, substantially as and for the purposes set forth.

20. In brick forming apparatus, a cutting table plunger according to claim 19 and wherein the face plates taper upwardly and are mounted so as to be capable of being rocked, for the purposes set forth.

21. In brick forming apparatus, a cutting table plunger provided with adjustable face plates and pins on the face plates entering convergent slots in a vertically adjustable bar, for the purposes set forth.

22. In brick forming apparatus, a cutting table plunger provided with adjustable face plates mounted in pairs to provide openings to pass upon cutting wires and pins on said face plates entering the convergent slots in a vertical adjustable bar in said plunger and also in a horizontal fixed bar on the latter substantially as and for the purposes set forth.

23. In brick forming apparatus, a travelling table, a vertical cutting frame thereon, a cutter pivotally mounted at one end of the cutting frame for operating at right angles through the clay bar adapted to be arranged on the travelling table, tension springs for operating said cutter and a catch for retaining the cutter in cutting position, the catch being pivoted and an arm on the table push and draw bar and connected with the catch so as to be pulled against the action of the spring to allow the pivoted cutter to operate while the table is moving solely under clay pressure.

24. In brick forming apparatus, a travelling cutting table having a vertical frame thereon, a pivoted frame carrying a cutting wire mounted on one end of said frame, a spring catch engaging said frame and retaining same in the cutting position against the action of springs, a cross guide in which the lower portion of said frame works, means for operating said catch to release said frame and a projection on the table plunger for engaging said frame and re-setting the cutter, as the plunger moves forward, substantially as described and illustrated.

25. In brick forming apparatus, a traveling cutting table provided with a frame and cutter, according to claim 23 and wherein one end of one tension spring is connected, to a stationary part and the other end of the same spring to one end of a centrally pivoted lever, the other end of the latter having connected thereto one end of another spring, the other end of which is connected to a flexible wire passing around a guide pulley, and attached to the frame of the cutter, substantially as described and illustrated.

26. In brick forming apparatus, a traveling table provided with a vertical frame carrying brick cutting wires and a clay bar cutter, and a horizontal row of knives actuated from said cutter to descend and bite into a severed length of clay, substantially as described and illustrated.

27. In brick forming apparatus, a travelling table provided with a vertical frame carrying brick cutting wires and a clay bar cutter and a horizontal row of knives actuated from said cutter to descend and bite into a severed length of clay and a pivoted bar to which the knives are secured mounted horizontally in the frame so that the knives are located one opposite each cutting wire of the frame.

28. In brick forming apparatus, a travelling cutting table, according to claim 27 and wherein, the knife carrying bar has keyed thereon at one end a fork fitting between the legs of which a stud on the frame of the pivoted clay bar cutter operates, for the purpose set forth, substantially as described and illustrated.

29. In brick forming apparatus according to claim 12, a horizontal cleaning bar working on said wires, a lever pivoted centrally of said table, a horizontally disposed vertical movable bar rigidly connected with the cleaning bar and operably connected with the lever, and means whereby the outer end of the lever is engaged so that movement of the table forces the cleaning bar up the wires and then allows the end of the lever to clear its engagement and the cleaning bar to drop, substantially as described.

30. Brick forming apparatus as claimed in claim 12, wherein a plunger supporting frame is connected to the cutting table, a horizontal shaft forming part of the main actuating means slidably supporting the outer end of the plunger supporting frame, cooperative means on the plunger supporting means and the horizontal shaft for effecting operation of the plunger at a predetermined time, and trip means for controlling the operation of the plunger.

31. Brick forming apparatus as claimed in claim 12, wherein an elevated rail is provided for facilitating the mounting of the cutting table, means on the wire cutting frame for engaging the rail to slidably support said table, a rotatable shaft forming a part of the main actuating means, a plunger supporting structure carried by the table and the frame and including bearings slidably engageable with the shaft for supporting the frame and the table, cooperative means mounted on the plunger supporting frame and on the shaft for effecting operation of the plunger, and trip means for controlling the operation of the actuating means for the plunger, substantially as and for the purposes set forth.

32. Brick forming apparatus as claimed in claim 12, wherein a horizontal power shaft forms part of the main actuating means and is arranged parallel of the line of travel of the cutting table, a plunger supporting frame carried with the cutting table and including spaced arms, bearings at the outer ends of the arms for slidable engagement with the shaft, a countershaft mounted in the arms of the plunger frame, crank discs keyed to the countershaft, push rods from said disc to the plunger, a gear wheel feathered on said power shaft, a sleeve loosely mounted on the counter shaft, a gear wheel and a dog tooth wheel geared on the sleeve, a disc carrying pawl adapted to engage the teeth of the dog tooth wheel, a trip lever for maintaining the pawl out of engagement with the teeth of the dog tooth wheel, and means for causing said trip lever to release said pawl substantially as and for the purposes set forth.

33. A brick forming, stacking and conveying apparatus including a bar forming means, a travelling cutting table, a movable delivery table to one side of which the cutting table is adapted to be moved after receiving the bar from the means, a wire cutting frame carried by the cutting table, a plunger also mounted on the cutting table opposite the wire cutting frame, actuating means for synchronously operating the cutting table, plunger and delivery table to effect the cutting of the severed bar and to effect forcing of the severed bar from the cutting table through the wire cutting frame so that bricks are arranged in stacked formation on the delivery table, and conveying means for receiving bricks in stacked formation from the delivery table.

In testimony whereof I have signed my name to this specification in the presence of two witnesses.

LAURITZ NEILSEN DYHRBERG.

Witnesses:
MARTIN JOSEPH O'BRIEN,
NORA SCANNELL.